US011477870B2

(12) United States Patent
Emoto et al.

(10) Patent No.: US 11,477,870 B2
(45) Date of Patent: Oct. 18, 2022

(54) ENVIRONMENTAL CONTROL EQUIPMENT CONTROL APPARATUS FOR CONTROLLING TARGET SPACE

(71) Applicant: DAIKIN INDUSTRIES, LTD., Osaka (JP)

(72) Inventors: Shiori Emoto, Osaka (JP); Atsushi Nishino, Osaka (JP); Satoshi Hashimoto, Saka (JP); Shouta Hori, Osaka (JP); Junya Nakase, Osaka (JP); Toshiyuki Maeda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 210 days.

(21) Appl. No.: 16/650,767

(22) PCT Filed: Sep. 28, 2018

(86) PCT No.: PCT/JP2018/036470
§ 371 (c)(1),
(2) Date: Mar. 25, 2020

(87) PCT Pub. No.: WO2019/066035
PCT Pub. Date: Apr. 4, 2019

(65) Prior Publication Data
US 2020/0224914 A1    Jul. 16, 2020

(30) Foreign Application Priority Data

Sep. 28, 2017   (JP) .............................. JP2017-188555
Sep. 28, 2017   (JP) .............................. JP2017-188556

(51) Int. Cl.
*F24F 11/64*     (2018.01)
*G06F 3/16*      (2006.01)
(Continued)

(52) U.S. Cl.
CPC .............. *H05B 47/10* (2020.01); *F24F 11/64* (2018.01); *F24F 11/74* (2018.01); *F24F 11/80* (2018.01);
(Continued)

(58) Field of Classification Search
CPC ...... H05B 47/10; H05B 47/11; H05B 47/115; H05B 47/105; F24F 11/64; F24F 11/74;
(Continued)

(56) References Cited

U.S. PATENT DOCUMENTS 5,170,935 A     12/1992  Federspiel et al.
5,259,553 A *   11/1993  Shyu ....................... F24F 1/022
                                                    236/44 C
(Continued)

FOREIGN PATENT DOCUMENTS

CN     105102899 A     11/2015
CN     105890121 A     8/2016
(Continued)

OTHER PUBLICATIONS

European Search Report of corresponding EP Application No. 21 19 4476.4 dated Nov. 26, 2021.
(Continued)

*Primary Examiner* — Ramesh B Patel
(74) *Attorney, Agent, or Firm* — Global IP Counselors, LLP

(57) ABSTRACT

An environmental control equipment control apparatus controls an environment of a target space using a plurality of environmental control equipment. The control apparatus includes a receiver and an electronic controller. The receiver may receive state information relating to states of a plurality of subject persons. In this case, the electronic controller controls a plurality of kinds of environmental control equipment such that the state information of the plurality of
(Continued)

subject persons received by the state information receiver satisfies a predetermined target state condition. The receiver may receive a second environmental stimulus given to a subject person other than a first environmental stimulus caused by control of the environmental control equipment. In this case, the electronic controller controls the environmental control equipment such that an influence of the second environmental stimulus received by the environmental stimulus receiver on the subject person is cancelled or reduced.

17 Claims, 10 Drawing Sheets

(51) Int. Cl.
    *F24F 11/74* (2018.01)
    *F24F 11/80* (2018.01)
    *H05B 45/10* (2020.01)
    *H05B 47/115* (2020.01)
    *H05B 47/11* (2020.01)
    *H05B 47/10* (2020.01)
    *F24F 120/14* (2018.01)

(52) U.S. Cl.
    CPC ............. *G06F 3/165* (2013.01); *H05B 47/11* (2020.01); *H05B 47/115* (2020.01); *F24F 2120/14* (2018.01)

(58) Field of Classification Search
    CPC .... F24F 11/80; F24F 2120/14; F24F 2110/10; F24F 2110/60; F24F 2130/30; F24F 2130/40; F24F 2221/02; F24F 11/70; F24F 11/79; G06F 3/165; Y02B 20/40; Y02B 30/70
    See application file for complete search history.

(56) References Cited

U.S. PATENT DOCUMENTS

| | | | |
|---|---|---|---|
| 9,152,154 B2 | 10/2015 | Gupta et al. | |
| 11,253,781 B2 * | 2/2022 | Ambinder | A63F 13/212 |
| 11,256,003 B2 * | 2/2022 | Qiu | B65B 55/22 |
| 2006/0112034 A1 * | 5/2006 | Okamoto | B25J 9/1697 706/16 |
| 2008/0071136 A1 * | 3/2008 | Oohashi | G10H 7/00 600/27 |
| 2011/0054638 A1 * | 3/2011 | Kogiso | G08C 19/00 700/12 |
| 2015/0019024 A1 | 1/2015 | Sabripour | |
| 2015/0032266 A1 * | 1/2015 | Weast | B60H 1/00842 700/276 |
| 2019/0318498 A1 * | 10/2019 | Yoshikawa | G06V 20/56 |
| 2020/0084423 A1 * | 3/2020 | Yamamoto | H04N 5/23299 |
| 2020/0208867 A1 * | 7/2020 | Emoto | F24F 11/65 |
| 2021/0000996 A1 * | 1/2021 | Kitagawa | G10L 25/51 |
| 2021/0341166 A1 * | 11/2021 | Emoto | F24F 11/64 |
| 2021/0348820 A1 * | 11/2021 | Kobayashi | F25B 25/005 |

FOREIGN PATENT DOCUMENTS

| | | |
|---|---|---|
| CN | 107014045 A2 | 8/2017 |
| EP | 2 985 540 A1 | 2/2016 |
| JP | 5-231693 A | 9/1993 |
| JP | 7-55226 A | 3/1995 |
| JP | 10-259943 A | 9/1998 |
| JP | 2003-314880 A | 11/2003 |
| JP | 2005-127690 A | 5/2005 |
| JP | 2007-315690 A | 12/2007 |
| JP | 2008-232467 A | 10/2008 |
| JP | 2011-186779 A | 9/2011 |
| JP | 2015-102307 A | 6/2015 |
| JP | 2016-217709 A | 12/2016 |
| JP | 2017-166762 A | 9/2017 |
| WO | 2013001407 A1 | 1/2013 |
| WO | 2016175219 A1 | 11/2016 |

OTHER PUBLICATIONS

International Preliminary Report of corresponding PCT Application No. PCT/JP2018/036470 dated Apr. 9, 2020.
International Search Report of corresponding PCT Application No. PCT/JP2018/036470 dated Dec. 4, 2018.
European Search Report of corresponding EP Application No. 18 86 2360.7 dated Oct. 7, 2021.

* cited by examiner

| | CHANGE IN AROUSAL LEVEL WHEN SET TEMPERATURE CHANGES (DECREASES) BY 1 DEGREE AS RESULT OF CONTROL OF AIR CONDITIONER | CHANGE IN AROUSAL LEVEL WHEN SET ILLUMINANCE CHANGES (INCREASES) BY 100 lx AS RESULT OF CONTROL OF LIGHTING APPARATUS |
|---|---|---|
| SUBJECT PERSON a | +3 | −1 |
| SUBJECT PERSON b | +2 | +1 |
| SUBJECT PERSON c | −1 | +2 |

ENVIRONMENTAL CONTROL EQUIPMENT CONTROL APPARATUS FOR CONTROLLING TARGET SPACE

CROSS-REFERENCE TO RELATED APPLICATIONS

This U.S. National stage application claims priority under 35 U.S.C. § 119(a) to Japanese Patent Application Nos. 2017-188556 and 2017-188555, filed in Japan on Sep. 28, 2017, the entire contents of which are hereby incorporated herein by reference.

BACKGROUND

Field of the Invention

This disclosure relates to an environment-control-means control apparatus.

Background Information

Hitherto, there has been desired to improve an environment of a space where workers are present in order to increase the work efficiency of the workers.

For example, an apparatus for controlling an air conditioner described in Japanese Unexamined Patent Application Publication No. 10-259943 has proposed maintaining the work efficiency of a person in a room high by performing, while grasping the arousal level of the subject person, an air conditioning operation for causing the arousal level to naturally change from a state of a low arousal level such as a dozing state to a state of a high arousal level.

SUMMARY

The apparatus described in Japanese Unexamined Patent Application Publication No. 10-259943 assumes the use of an air conditioner capable of performing air conditioning control centering on a single area freely selected from among a plurality of areas of a room. While checking the arousal levels of a plurality of subject persons who are present in the room, the apparatus performs air conditioning control for increasing the arousal level particularly for an area where a person having a low arousal level is present.

However, the apparatus described in Japanese Unexamined Patent Application Publication No. 10-259943 does not consider at all the case where an environmental change caused by certain air conditioning control influences not only a single particular subject person but also a plurality of subject persons.

For example, when an environment of a space where a plurality of subject persons are present is changed, the environmental change influences each of the subject persons. Therefore, the arousal level of the particular subject person can be improved but the arousal level of another subject person may significantly deteriorate.

An environment-control-means control apparatus according to a first aspect is an environment-control-means control apparatus that controls an environment of a target space where a plurality of subject persons are present, using a plurality of kinds of environment control means, and that includes a state information grasping unit and a control unit. The state information grasping unit grasps state information relating to states of the plurality of subject persons. The control unit controls the plurality of kinds of environment control means such that the state information of the plurality of subject persons that is grasped by the state information grasping unit satisfies a predetermined target state condition.

Here, the state information includes mental or physical state information and biological state information. Among these, the mental or physical state information is secondary information estimated from primary information (such as a heartbeat) obtained by performing a measurement on a subject person, and includes, for example, information such as the arousal level, the concentration level, the nervousness level, the resting level, and an autonomic nerve balance index such as LF/HF. In addition, the biological state information is primary information obtained by performing a measurement on a subject person using a measurement apparatus and includes, for example, information such as a heartbeat, body temperature, an amount of sweat, and voice. In addition, the arousal level is not limited. For example, the arousal level may be determined on the basis of the state of the heartbeat of the subject person, may be determined on the basis of a respiration rate of the subject person per unit time, may be determined on the basis of a electroencephalogram of the subject person, or may be determined on the basis of a combination of these.

The control on the plurality of kinds of environment control means is not limited. For example, the driving statuses of all the plurality of kinds of environment control means may change as a result of performing control, the driving statues of one or some of the plurality of kinds of environment control means may change as a result of performing control but the driving statuses of the other kinds of environment control means may remain unchanged, or the driving statuses of all the plurality of kinds of environment control means may remain unchanged as a result of performing control.

In addition, the predetermined target state condition may be a condition constituted by a group of individual target state conditions of the respective subject persons or may be a target state condition that is shared by the individual subject persons. In addition, the predetermined target state condition is not limited. When degrees of deviations of the state information of the individual subject persons from the respective target states can be quantified, the predetermined target state condition may be a condition for decreasing the largest value among those. When the state information of the individual subject persons can be represented as values, the predetermined target state condition may be a condition for optimizing the total sum of the values. When the state information of the individual subject persons can be represented as values, the predetermined target state condition may be a condition for making the state information of all the subject persons be in a predetermined target range.

Note that an environmental stimulus that is controllable by environment control means may be temperature, humidity, wind velocity, odor, sound, light, or the like.

This environment-control-means control apparatus enables the states of the plurality of subject persons to be more likely to be changed as desired by providing an environmental stimulus causing the state information of the individual subject persons satisfies the predetermined target state condition, by using one kind of stimulus or a combination of a plurality of kinds of stimuli among a plurality of kinds of environmental stimuli that can be supplied by the plurality of kinds of environment control means.

An environment-control-means control apparatus according to a second aspect is the environment-control-means control apparatus according to the first aspect that further includes a characteristics grasping unit. The characteristics grasping unit grasps response characteristics information for the plurality of subject persons. The response characteristics information indicates response characteristics to each kind of environmental stimulus that is changeable using the plurality of kinds of environment control means. The control unit controls the plurality of kinds of environment control means on the basis of the state information of the plurality of subject persons that is grasped by the state information grasping unit and the response characteristics information grasped by the characteristics grasping unit.

Here, the response characteristics information may be grasped by accumulating response data of each subject person obtained when the environment-control-means control apparatus controls each piece of environment control means and by creating the response characteristics information using the accumulated data, or may be grasped by the environment-control-means control apparatus receiving input of information obtained outside.

When an environment changes in response to control on the plurality of kinds of environment control means, the plurality of subject persons who are present in the target space are influenced. Since the response characteristics to the change in the environment differ from subject person to subject person, there may be a subject person whose state greatly deviates from a desired state.

However, this environment-control-means control apparatus is capable of controlling the plurality of kinds of environment control means using the state information and the response characteristics information of the plurality of subject persons in consideration of the fact that the response characteristics to the change in the environmental stimulus differ from subject person to subject person. Thus, the states of the plurality of subject persons are more likely to approach the desired states.

An environment-control-means control apparatus according to a third aspect is the environment-control-means control apparatus according to the second aspect, in which the characteristics grasping unit creates the response characteristics information using accumulated information of the state information of the plurality of subject persons that is grasped by the state information grasping unit in response to control performed on the plurality of kinds of environment control means by the control unit.

In this environment-control-means control apparatus, the characteristics grasping unit itself creates the response characteristics information by using the accumulated information of the state information of the plurality of subject persons obtained in response to control performed on the plurality of kinds of environment control means. Thus, since the actual responsiveness of each subject person to control performed on the environment control means is used when the response characteristics information is created, the reliability of the obtained response characteristics information can be improved.

An environment-control-means control apparatus according to a fourth aspect is the environment-control-means control apparatus according to the second aspect or the third aspect that further includes an receiving unit that receives the response characteristics information or input of information relating to the response characteristics information. The characteristics grasping unit grasps the response characteristics information using the information received by the receiving unit.

Here, the "information relating to the response characteristics information" is not limited. For example, the information relating to the response characteristics information is not the response characteristics information itself but may be information used for obtaining the response characteristics information. In the case where the receiving unit receives the information relating to the response characteristics information, the characteristics grasping unit may create the response characteristics information on the basis of the information relating to the response characteristics information, and may consequently grasp the response characteristics information.

In this environment-control-means control apparatus, the receiving unit receives the response characteristics information. This consequently enables the characteristics grasping unit to grasp the response characteristics information.

An environment-control-means control apparatus according to a fifth aspect is the environment-control-means control apparatus according to any one of the second aspect to the fourth aspect, in which the characteristics grasping unit grasps the response characteristics information of a first subject person who is at least one subject person among the plurality of subject persons and applies the response characteristics information of the first subject person to a subject person who is determined to have a similarity to the first subject person among the plurality of subject persons.

Here, the determination of the similarity is not limited. For example, a subject person assigned a certain predetermined index belonging to the same range as that of the first subject person may be identified as a subject person having a similarity to the first subject person. The index is not limited. For example, physical data such as age, gender, weight, and any combination of these may be used as the index.

This environment-control-means control apparatus is capable of estimating response characteristics of another subject person having a similarity to the first subject person by using the response characteristics information of the first subject person who is at least one subject person among the plurality of subject persons, Consequently, work for separately identifying the response characteristics of the other subject person is no longer needed. Thus, the load of the characteristics grasping unit for grasping the response characteristics information of individual subject persons can be suppressed to be small.

An environment-control-means control apparatus according to a sixth aspect is the environment-control-means control apparatus according to any one of the first aspect to the fifth aspect, in which the plurality of kinds of environment control means include at least any two or more of an apparatus that adjusts temperature, an apparatus that adjusts humidity, an apparatus that adjusts wind velocity, an apparatus that adjusts carbon dioxide concentration, an apparatus that adjusts odor, an apparatus that adjusts sound, and an apparatus that adjusts light.

Here, two or more of an apparatus that adjusts temperature, an apparatus that adjusts humidity, an apparatus that adjusts wind velocity, an apparatus that adjusts carbon dioxide concentration, an apparatus that adjusts odor, an apparatus that adjusts sound, and an apparatus that adjusts light may be integrated to form a single apparatus.

This environment-control-means control apparatus is capable of causing the states of the subject persons to approach a target state by using at least any two or more of an apparatus that adjusts temperature, an apparatus that adjusts humidity, an apparatus that adjusts wind velocity, an apparatus that adjusts carbon dioxide concentration, an apparatus that adjusts odor, an apparatus that adjusts sound, and an apparatus that adjusts light.

Hitherto, there has been desired to improve an environment of a space where workers are present in order to increase the work efficiency of the workers.

For example, an apparatus for controlling an air conditioner described in Japanese Unexamined Patent Application Publication No. 10-259943 has proposed maintaining the work efficiency of a person in a room high by performing, while grasping the arousal level of the subject person, an air conditioning operation for causing the arousal level to naturally change from a state of a low arousal level such as a dozing state to a state of a high arousal level.

The apparatus described in Japanese Unexamined Patent Application Publication No. 10-259943 detects a degree of inclination or swinging of the head of a subject person using an image processing circuit to grasp that the subject person is in a dozing state or the like, and controls an air conditioner to increase the arousal level of the subject person.

However, the apparatus described in Japanese Unexamined Patent Application Publication No. 10-259943 controls an air conditioner to increase the arousal level only after the subject person is in the dozing state or the like because of an environment around the subject person and the head of the subject person enters an inclined state or a swinging state. Accordingly, the state such as the arousal level of the subject person has already worsened greatly at the time when control of the air conditioner is started to increase the arousal level.

In addition, causes of such a change in the arousal level of the subject person may be a stimulus given by an environmental factor that is not controlled by an air conditioner as well as a stimulus given by environmental factors such as temperature and humidity that are controllable by the air conditioner. Controlling the state of the subject person by focusing on such an environmental factor that is not controlled by the air conditioner has not been studied at all. However, it is desired to suppress an influence of receiving an unintended environmental stimulus from the outside on a subject person to be small.

An environment-control-means control apparatus according to a seventh aspect is an environment-control-means control apparatus that controls an environment of a target space where a subject person is present, using environment control means, and that includes an environmental stimulus grasping unit and a control unit. The environmental stimulus grasping unit grasps a second environmental stimulus that is n environmental stimulus given to the subject person other than a first environmental stimulus caused by control of the environment control means. The control unit controls the environment control means such that an influence of the second environmental stimulus grasped by the environmental stimulus grasping unit on the subject person is cancelled or reduced.

Here, the environmental stimulus that is controllable by the environment control means is not limited, and may be, for example, at least one or more kinds selected from temperature, humidity, wind velocity, odor, sound, light, radiant heat, and combinations of these.

Note that the second environmental stimulus is not limited, and may be, for example, stimuli relating to temperature, humidity, odor, sound, light, vibration, and combinations of these. Here, a stimulus relating to sound is not limited. Examples of such a stimulus include a stimulus given to a subject person by sound having a sound pressure of a predetermined level or higher, a stimulus given to a subject person by sound having a predetermined frequency or higher, and a stimulus given to a subject person as a result of continuation of a too-silent state in which the volume of sound is a predetermined level or lower for a predetermined time period or longer. Note that the second environmental stimulus is an environmental stimulus other than the first environmental stimulus caused by control of the environment control means and may be a stimulus of the same kind as the kind of the first environmental stimulus as long as the stimulus is not caused by the control of the environment control means. However, the second environmental stimulus is preferably a stimulus of a kind different from the kind of the first environmental stimulus.

In addition, control performed on the environment control means to cancel or reduce the influence of the second environmental stimulus on the subject person is not limited. Examples of such control include performing control such that a cause of the second environmental stimulus is removed or reduced, performing control such that the sensitivity of the subject person to the second environmental stimulus is reduced, performing control such that psychological nervous system reaction which is a psychological reaction and/or a reaction of the autonomic nervous system of the subject person to the second environmental stimulus is reduced, and any combination of these.

This environment-control-means control apparatus is capable of cancelling or reducing an influence on a subject person by controlling an environmental stimulus unintendedly given to the subject person, by using environment control means used for controlling an environment of a target space. Thus, an influence of an environmental stimulus unintendedly given to a subject person on the subject person can be suppressed.

An environment-control-means control apparatus according to an eighth aspect is the environment-control-means control apparatus according to the seventh aspect, in which a plurality of kinds of the environment control means are provided. The plurality of kinds of environment control means are capable of supplying environmental stimuli of kinds that are different from each other. The control unit controls the plurality of kinds of environment control means such that an influence of the second environmental stimulus grasped by the environmental stimulus grasping unit on the subject person is cancelled or reduced.

This environment-control-means control apparatus can use the plurality of kinds of environment control means to cancel or reduce the influence of the second environmental stimulus on the subject person. Thus, it becomes easier to cancel or reduce an influence of a stimulus unintendedly given to a subject person on the subject person.

An environment-control-means control apparatus according to a ninth aspect is the environment-control-means control apparatus according to the seventh aspect or the eighth aspect, in which the plurality of kinds of environment control means include at least any two or more of an apparatus that adjusts temperature, an apparatus that adjusts humidity, an apparatus that adjusts wind velocity, an apparatus that adjusts carbon dioxide concentration, an apparatus that adjusts odor, an apparatus that adjusts sound, an apparatus that adjusts light, and an apparatus that adjusts radiant heat.

This environment-control-means control apparatus performs control using at least any two or more of an apparatus that adjusts temperature, an apparatus that adjusts humidity, an apparatus that adjusts wind velocity, an apparatus that adjusts carbon dioxide concentration, an apparatus that adjusts odor, an apparatus that adjusts sound, an apparatus that adjusts light, and an apparatus that adjusts radiant heat. Thus, the environment-control-means control apparatus can suppress an influence of a stimulus unintendedly given to a subject person on the subject person to be small.

An environment-control-means control apparatus according to a tenth aspect is the environment-control-means control apparatus according to any one of the seventh aspect to the ninth aspect that further includes a state information grasping unit. The state information grasping unit grasps state information relating to a state of the subject person. The control unit controls the environment control means such that an influence, on the subject person, of a change other than a change caused by control of the environment control means among changes in the state information is cancelled or reduced.

Here, the state information includes mental or physical state information and biological state information. Among these, the mental or physical state information is secondary information estimated from primary information (such as a heartbeat) obtained by performing a measurement on a subject person, and includes, for example, information such as the arousal level, the concentration level, the nervousness level, the resting level, and an autonomic nerve balance index such as LF/HF. In addition, the biological state information is primary information obtained by performing a measurement on a subject person by using a measurement apparatus and includes, for example, information such as a heartbeat, body temperature, an amount of sweat, and voice. In addition, the arousal level is not limited. For example, the arousal level may be determined on the basis of the state of the heartbeat of the subject person, may be determined on the basis of a respiration rate of the subject person per unit time, may be determined on the basis of a electroencephalogram of the subject person, or may be determined on the basis of a combination of these.

Even if the environmental stimulus grasping unit of the environment-control-means control apparatus grasps the second environmental stimulus, the mental or physical state or the biological state of the subject person does not necessarily actually change greatly and the second environmental stimulus is only a stimulus which the subject person does not care in some cases.

However, in this environment-control-means control apparatus, the state information grasping unit grasps the state information such as mental or physical state information and biological state information of the subject person. The control unit controls the environment control means such that an influence, on the subject person, of a change other than a change caused by control of the environment control means among changes in the state information grasped by the state information grasping unit is cancelled or reduced. Thus, the stimulus that actually causes the mental or physical state or the biological state of the subject person to change can be reduced when the environmental stimulus grasping unit grasps the second environmental stimulus.

A environment-control-means control apparatus according to an eleventh aspect is the environment-control-means control apparatus according to any one of the seventh aspect to the tenth aspect, in which the environmental stimulus grasping unit grasps an environmental stimulus of at least one of sound and odor.

This environment-control-means control apparatus is capable of suppressing an influence, on a subject person, of at least one environmental stimulus among sound and odor unintendedly given to the subject person to be small.

BRIEF DESCRIPTION OF THE DRAWINGS

FIG. 3 is a table illustrating examples of response characteristics data of individual subject persons corresponding to individual environmental stimuli.
FIG. 10 is a table illustrating examples of a plurality of control candidates for each subject person on a purpose-by-purpose basis and on a stimulus-by-stimulus basis according to a modification M according to the appendix.

DETAILED DESCRIPTION

One embodiment of an environmental equipment control system in which an environmental equipment control apparatus is adopted will be described below by way of example.

Figure 1:
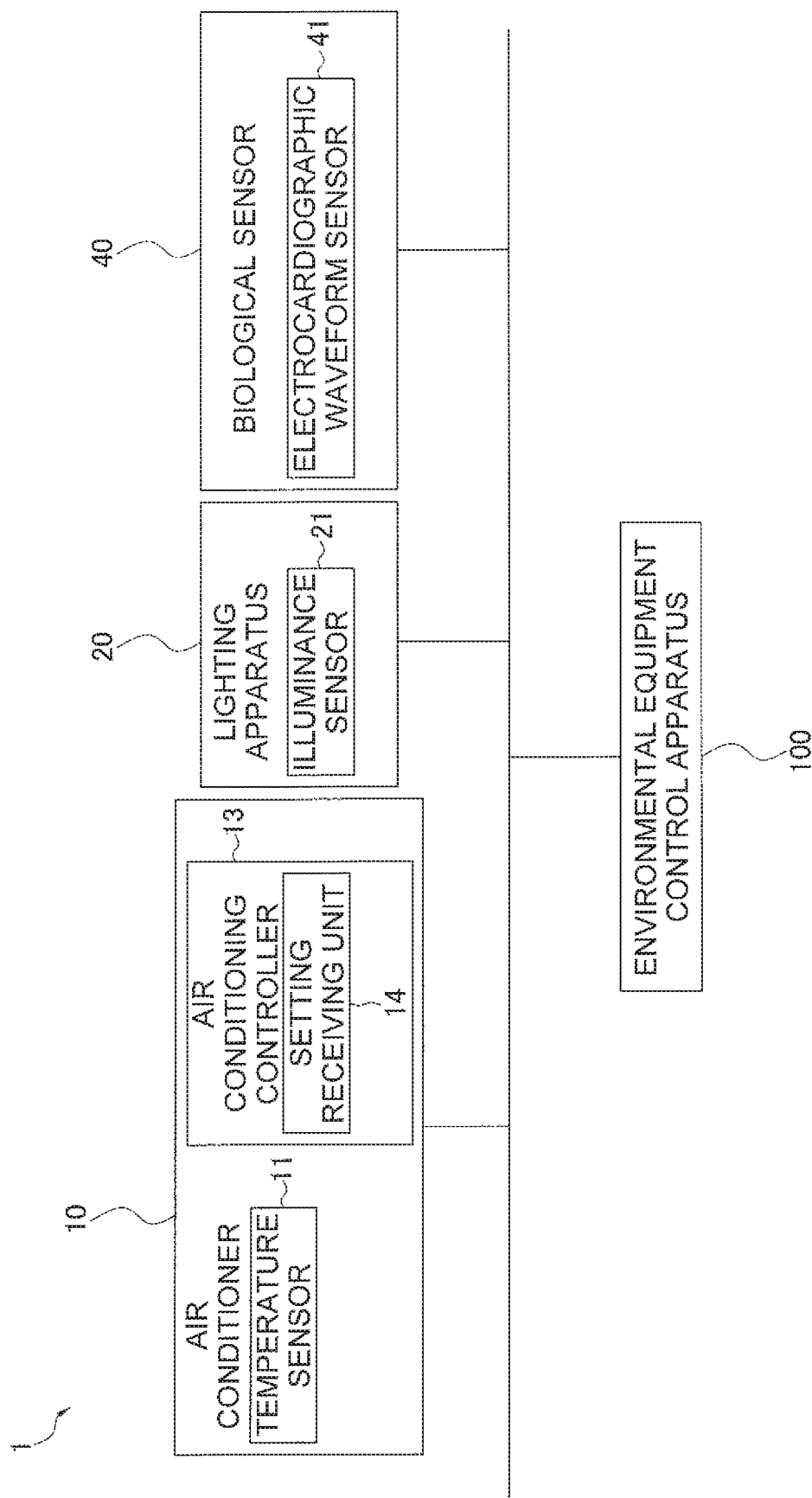
FIG. 1 is a diagram of a schematic configuration of the entirety of an environmental equipment control system.

(1) Schematic Configuration of Entirety of Environmental Equipment Control System FIG. 1 is a diagram illustrating a schematic configuration of the entirety of an environmental equipment control system 1.

The environmental equipment control system 1 is a system that uses a plurality of kinds of environmental equipment to cause an arousal level of a subject person to approach a target arousal level.

The environmental equipment control system 1 mainly includes an air conditioner 10, a lighting apparatus 20, a biological sensor 40, and an environmental equipment control apparatus 100. These apparatuses are connected to each other with a cable or wirelessly to be able to communicate with each other.

The air conditioner 10 and the lighting apparatus 20 are pieces of environmental equipment of kinds different from each other and are pieces of equipment capable of controlling the arousal level of a subject person.

The air conditioner 10 is an apparatus capable of adjusting the temperature in a room where a subject person is present, and includes an refrigerant circuit capable of implementing a refrigeration cycle in which a compressor, a condenser, an expansion valve, and an evaporator are connected as a result of connection of an outdoor unit and an indoor unit which are not illustrated. The air conditioner 10 includes a temperature sensor 11 that detects the air temperature in a room, and an air conditioning controller 13 that performs various kinds of air conditioning control such as a cooling operation and a heating operation. Note that the air conditioning controller 13 includes a CPU, a ROM, a RAM, and so forth.

This air conditioning controller 13 includes a setting receiving unit 14 that receives instructions of various air conditioning control modes such as a cooling operation and a heating operation and instructions of a set temperature and a set airflow from the subject person.

In addition, the setting receiving unit 14 of the air conditioning controller 13 also receives various kinds of input data that are used in the environmental equipment control system 1 from the subject person. Specifically, the setting receiving unit 14 of the air conditioning controller 13 receives input of information on the complexity of work which the subject person is going to perform. The complexity of the work may be determined in advance by the setting receiving unit 14 classifying the work into a plurality of steps, for example. The subject person may then select a specific step from among the plurality of steps, so that the setting receiving unit 14 may receive the complexity of the work. Generally, in the case where a person performs simple work, the work efficiency can be increased as the arousal level increases, whereas in the case where a person performs complex work, the work efficiency may decrease when the arousal level is too high (Yerkes-Dodson law). Therefore, there is an optimum arousal level depending on the kind of work to be performed. Information received by the setting receiving unit 14 here is used for controlling the arousal level of each subject person so that the subject person efficiently performs work to be done.

The setting receiving unit 14 of the air conditioning controller 13 further receives information on a condition for starting arousal level control to be described later. Specifically, the setting receiving unit 14 receives the condition for starting arousal level control to be described later through input from the subject person. The condition for starting arousal level control is not limited, and may be a specific time in a day or may be the case where a deviation from a target arousal level of a specific subject person or an average of deviations from respective target arousal levels of all subject persons exceeds a predetermined value.

The information on the complexity of work and the information on the condition for starting arousal level control that are received by the setting receiving unit 14 here are transmitted from the air conditioner 10 to the environmental equipment control apparatus 100.

The lighting apparatus 20 is an apparatus capable of adjusting the illuminance in a room where a subject person is present, and includes a light emitter such as an LED whose illuminance is controllable and an illuminance sensor 21 disposed at a predetermined position in the room.

The biological sensor 40 is a sensor for grasping the arousal level of each subject person, and includes an electrocardiographic waveform sensor 41 that detects an electrocardiographic waveform of each subject person in the present embodiment. The electrocardiographic waveform sensor 41 is attached near the heart of each subject person for use, and is capable of wirelessly transmitting data of the detected electrocardiographic waveform to a peripheral device such as the environmental equipment control apparatus 100.

As described later, the environmental equipment control apparatus 100 is an apparatus that receives the information on the complexity of work for each subject person from the setting receiving unit 14 of the air conditioning controller 13 to grasp a range of the target arousal level of the subject person, that receives the data of the electrocardiographic waveform from the biological sensor 40 to estimate the current arousal level of the subject person, and that controls various kinds of environmental equipment so that the arousal level of the subject person can be kept in the range of the target arousal level of the subject person.

(2) Configuration of Environmental Equipment Control Apparatus 100

Figure 2:
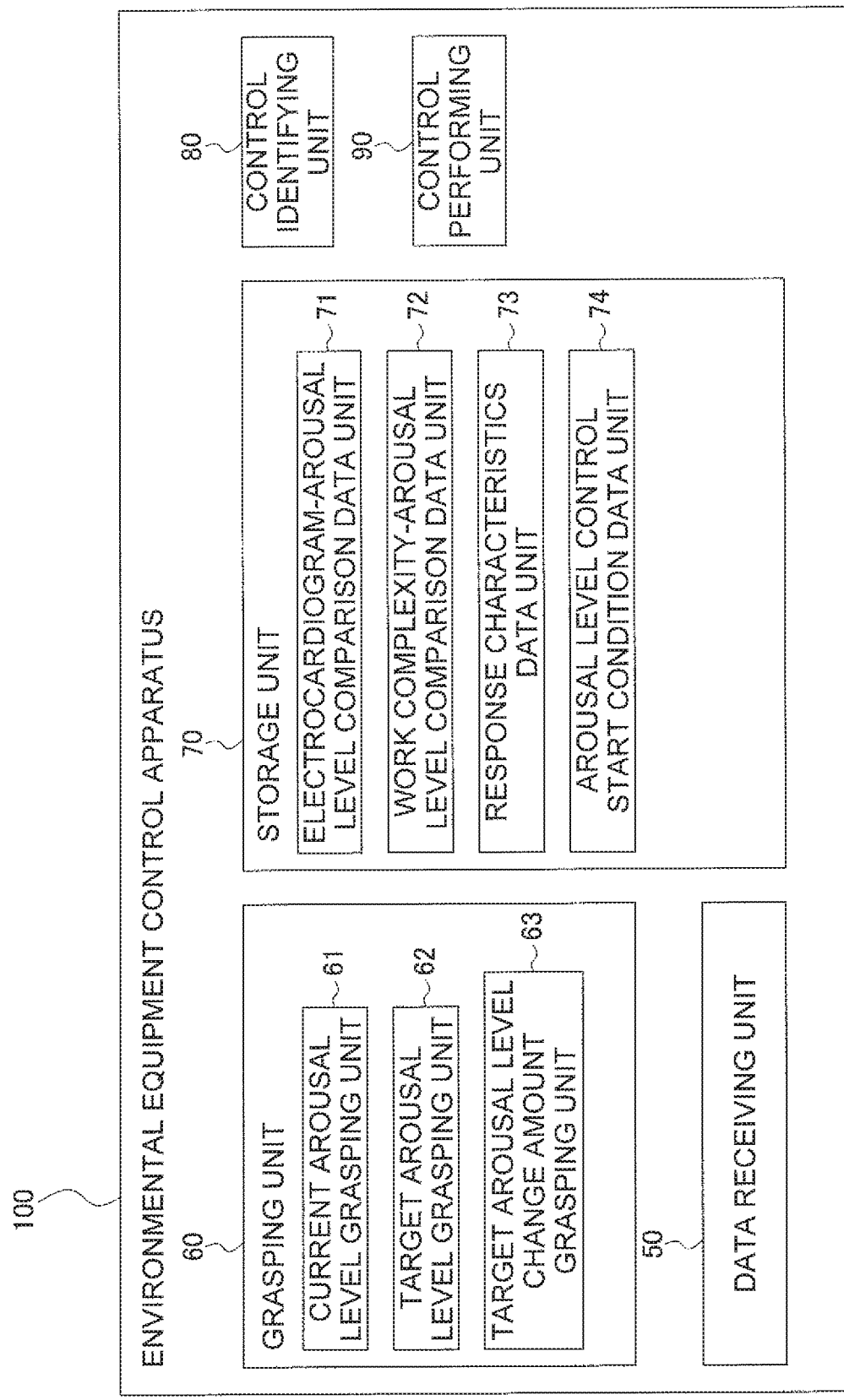
FIG. 2 is a block diagram of a configuration of an environmental equipment control apparatus.

FIG. 2 is a block diagram illustrating a functional configuration of the environmental equipment control apparatus 100.

The environmental equipment control apparatus 100 includes a data receiving unit 50 for receiving various kinds of information, a grasping unit 60 for grasping various kinds of information, a storage unit 70 for storing various kinds of data, a control identifying unit 80 that determines control to be performed by each environmental equipment, and a control performing unit 90 that causes the control identified by the control identifying unit 80 to be performed. This environmental equipment control apparatus 100 is capable of acquiring information transmitted from the biological sensor 40 and the setting receiving unit 14 of the air conditioning controller 13 and controlling the air conditioner 10 and the lighting apparatus 20. The environmental equipment control apparatus 100 includes one or a plurality of CPUs, ROMs, and RAMs.

(2-1) Data Receiving Unit 50

The data receiving unit 50 is configured to be capable of receiving the information on the complexity of work for each subject person from the setting receiving unit 14 of the air conditioning controller 13 and receiving data of an electrocardiographic waveform from the biological sensor 40. In addition, the data receiving unit 50 is configured to be capable of receiving input of response characteristics data which is data indicating response characteristics of each subject person to individual environmental stimuli, which will be described later. A means for receiving the response characteristics data in the data receiving unit 50 here is not limited. For example, the response characteristics data may be received via a recording medium storing the response characteristics data, or the response characteristics data may be received as a result of the data receiving unit 50 receiving, via communication, the response characteristics data received by the setting receiving unit 14 of the air conditioning controller 13.

The information received and the information received by the data receiving unit 50 can be referred to by each unit of the environmental equipment control apparatus 100.

(2-2) Grasping Unit 60

The grasping unit, or receiver, 60 includes a current arousal level grasping unit, or receiver, 61, a target arousal level grasping unit, or receiver, 62, a target arousal level change amount grasping unit, or receiver, 63, and so forth. The grasping unit 60 is constituted by one or a plurality of CPUs, RAMs, and so forth.

The current arousal level grasping unit 61 grasps the current arousal level of each subject person in consideration of an electrocardiogram-arousal level comparison data unit 71 stored in the storage unit 70 described later, on the basis of content detected by the electrocardiographic waveform sensor 41 for the subject person and received by the data receiving unit 50 from the biological sensor 40.

The target arousal level grasping unit 62 grasps a range of the target arousal level for each subject person in consideration of a work complexity-arousal level comparison data unit 72 stored in the storage unit 70 described later, in accordance with the information on the complexity of work of the subject person received by the data receiving unit 50 from the setting receiving unit 14 of the air conditioning controller 13 (in accordance with the complexity of the work). Specifically, the target arousal level grasping unit 62 grasps, for each subject person, a range of the target arousal level so that the target arousal level increases as the complexity decreases in accordance with a predetermined relationship in the case where the complexity of the work is less than a predetermined criterion complexity and that the arousal level becomes a predetermined arousal level at which the work efficiency can be increased according to the Yerkes-Dodson law in the case where the complexity of the work is more than or equal to the predetermined criterion complexity.

The target arousal level change amount grasping unit 63 grasps, for each subject person, a target amount of change ($\Delta A$) in the arousal level which is a difference between the current arousal level of the subject person grasped by the current arousal level grasping unit 61 and the range of the target arousal level of the subject person grasped by the target arousal level grasping unit 62.

(2-3) Storage Unit 70

The storage unit 70 includes the electrocardiogram-arousal level comparison data unit 71, the work complexity-arousal level comparison data unit 72, a response characteristics data unit 73, an arousal level control start condition data unit 74, and so forth. The storage unit 70 is constituted by one or a plurality of ROMs, RAMs, or the like.

As described above, the electrocardiogram-arousal level comparison data unit 71 stores in advance data for grasping the arousal level estimated from the content detected by the electrocardiographic waveform sensor 41 of the biological sensor 40. A relationship between the electrocardiographic waveform and the arousal level is determined based on known matters. For example, the arousal level of a subject person may be grasped by identifying the arousal level corresponding to the electrocardiographic waveform grasped by the electrocardiographic waveform sensor 41 with reference to data of the relationship between the electrocardiographic waveform and the arousal level that is stored in advance.

As described above, the work complexity-arousal level comparison data unit 72 stores in advance data for grasping the arousal level which allows a subject person to efficiently perform work from content of the information on the complexity of the work of the subject person transmitted from the setting receiving unit 14 of the air conditioning controller 13 and received by the data receiving unit 50. Specifically, data defining the correspondences is stored in advance so that the target arousal level increases as the complexity decreases in the case where the complexity of the work is less than the predetermined criterion complexity and that the arousal level becomes a arousal level at which the work efficiency can be increased according to the Yerkes-Dodson law in the case where the complexity of the work is more than or equal to the predetermined criterion complexity.

The response characteristics data unit 73 stores response characteristics data which is data that is received by the data receiving unit 50 and indicates response characteristics of each subject person to individual environmental stimuli. The response characteristics data is not limited. For example, the response characteristics data may be data created using information obtained by prompting in advance each subject person to self-assesses a sense about a change in the arousal level which the subject person feels in response to a change in temperature resulting from control performed by the air conditioner 10 or a change in illuminance resulting from control performed on the lighting apparatus 20. More specifically, the response characteristics data may include a combination of information in which the sense of the arousal level which each subject person feels in response to an decreasing change in temperature in a predetermined unit is categorized by a plurality of numerical values and information in which the sense of the arousal level which the subject person feels in response to an increasing change in illuminance in a predetermined unit is categorized by a plurality of numerical values. For example, as in a table illustrated in FIG. 3, information is exemplified which is a combination of information indicating changes in the arousal levels of all (three in this example) subject persons A, B, and C who are present in a room in the case where the set temperature changes (decreases) by 1 degree, which is the predetermined unit temperature, as a result of control performed by the air conditioner 10 and information indicating changes in the arousal levels of the respective subject persons A, B, and C who are present in the room in the case where the set illuminance changes (increases) by 100 1x, which is the predetermined unit illuminance, as a result of control performed by the lighting apparatus 20.

As described above, the arousal level control start condition data unit 74 stores information on the condition for starting arousal level control that is transmitted from the setting receiving unit 14 of the air conditioning controller 13 and is received by the data receiving unit 50.

(2-4) Control Identifying Unit 80

To achieve the target amount of change ($\Delta A$) in the arousal level of each subject person grasped by the target arousal level change amount grasping unit 63, the control identifying unit 80 identifies specific contents of temperature control performed by the air conditioner 10 and illuminance control performed by the lighting apparatus 20 on the basis of the response characteristics data stored in the response characteristics data unit 73. The control identifying unit 80 includes one or a plurality of CPUs, a RAM, and so forth.

For example, description will be given of the case of identifying control contents corresponding to the target amounts of changes ($\Delta A$) in the arousal levels of the respective subject persons when the three subject persons a to c having response characteristics illustrated in FIG. 3 are present in the room. That is, the response characteristics data indicates that changes in the arousal levels in the case where the set temperature changes (decreases) by 1 degree from the current state as a result of temperature control performed by the air conditioner 10 are "+3" for the subject person a, "+2" for the subject person b, and "−1" for the subject c and that changes in the arousal levels in the case where the set illuminance changes (increases) by 100 1x from the current state as a result of illuminance control performed by the lighting apparatus 20 are "−1" for the subject person a, "+1" for the subject person b, and "+2" for the subject person c. In such a case, control performed by the air conditioner 10 and the lighting apparatus 20 to bring the arousal levels of the individual subject persons A to C in or closer to the range of the target arousal levels of the respective subject persons is identified. Here, in the case where the target amount of changes ($\Delta A$) in the arousal levels of the respective subject persons that are grasped by the target arousal level change amount grasping unit 63 are "+3 to 5" for the subject person a, "+5 to 7" for the subject person b, and "+3 to 4" for the subject person c, the control identifying unit 80 can identify control for "decreasing the set temperature of the air conditioner 10 by 2 degrees and increasing the illuminance of the lighting apparatus 20 by 300 lx", for example. The identified control causes a change in the arousal level of the subject person a by "+3", a change in the arousal level of the subject person b by "+7", and a change in the arousal level of the subject person c by "+4". Thus, the arousal levels of all the subject persons a to c can be controlled to be in the range of the target arousal levels of the respective persons.

Note that the method for identifying the control contents used by the control identifying unit 80 is not limited. Suppose that control contents constituted by a combination of a plurality of controls for changing the set temperature performed by the air conditioner 10 and for changing the illuminance performed by the lighting apparatus 20 are performed. The changes in the arousal levels of the individual subject persons in such a case may be determined by performing arithmetic processing for the individual control contents to determine the respective arithmetic processing results, and the control contents that satisfy the target amounts of changes (ΔA) in the arousal levels of all the subject persons may be identified from the determined arithmetic processing results. In this case, a case may occur where control content for only one of the air conditioner 10 and the lighting apparatus 20 is changed without changing the control state of the other one of the air conditioner 10 and the lighting apparatus 20 depending on the situation. In addition, if there are a plurality of kinds of control contents that satisfy the target amount of changes (ΔA) in the arousal levels of all the subject persons, control contents for which a degree of change from the current state is the smallest may be identified, or an apparatus for which the change is prioritized among the air conditioner 10 and the lighting apparatus 20 may be determined in advance and control contents may be identified on the basis of the priority. If there is no control contents that satisfy the target amounts of changes (ΔA) in the arousal levels of all the subject persons, for example, control contents for which the total sum of deviations of the arousal levels of the respective subject persons after the change caused by the control from the ranges of the target arousal levels of the respective subject persons is the smallest may be identified, or control contents for which the maximum value of deviations of the arousal levels of the respective subject persons after the change caused by the control from the ranges of the target arousal levels of the respective subject persons is the smallest may be identified.

Note that the above-described identification of control contents performed by the control identifying unit 80 is performed when the condition for starting arousal level control stored in the arousal level control start condition data unit 74 is satisfied.

(2-5) Control Performing Unit 90

As described above, the control performing unit 90 causes control identified by the control identifying unit 80 to be performed. The control performing unit 90 is constituted by one or a plurality of CPUs, a RAM, and so forth. Specifically, the control performing unit 90 transmits the control contents identified by the control identifying unit 80 to the air conditioner 10 and the lighting apparatus 20 which are pieces of environmental equipment of the environmental equipment control system 1 to cause the air conditioner 10 and the lighting apparatus 20 to perform the control contents.

(3) Process by Environmental Equipment Control Apparatus 100

Figure 4:
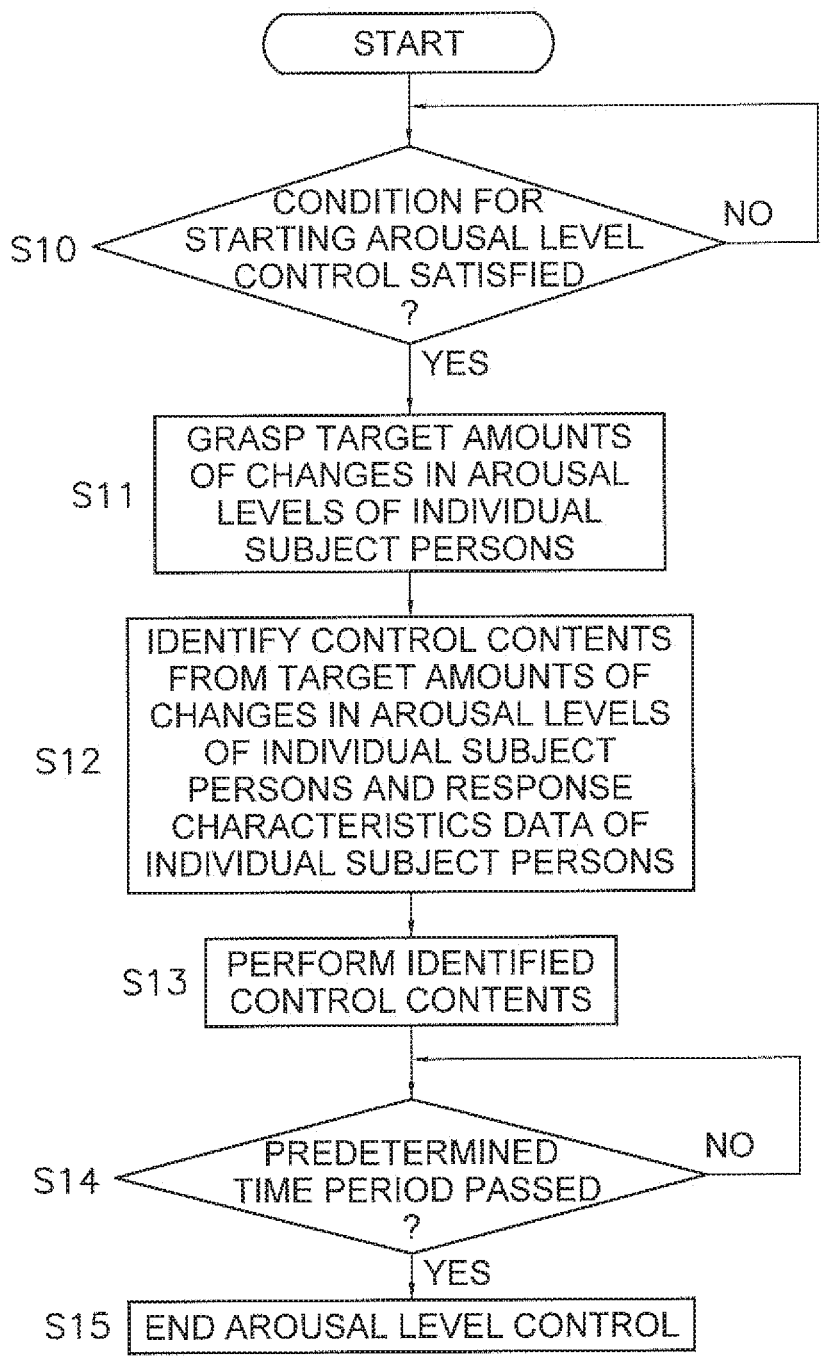
FIG. 4 is a flowchart of a process performed by the environmental equipment control apparatus.

FIG. 4 is a flowchart of a process performed by the environmental equipment control apparatus 100.

Here, description will be given of the case where arousal level control is started in response to satisfaction of the condition for starting the arousal level control from a state before the arousal level control is performed, that is, from a state in which the air conditioner 10 and the lighting apparatus 20 are controlled on the basis of the set temperature and the set illuminance set therefor, respectively.

In step S10, the control identifying unit 80 determines whether the condition for starting arousal level control stored in the arousal level control start condition data unit 74 is satisfied. For example, when the condition for starting arousal level control is defined as predetermined time, it is determined that the condition for starting arousal level control is satisfied upon the time being reached. Here, if it is determined that the condition for starting arousal level control is satisfied, the process proceeds to step S11 to start arousal level control. If it is not determined that the condition for starting arousal level control is satisfied, the state in which the air conditioner 10 and the lighting apparatus 20 are controlled on the basis of the set temperature and the set illuminance, respectively, is continued.

In step S11, the grasping unit 60 grasps various kinds of information. Specifically, as described above, the current arousal level grasping unit 61 grasps the current arousal level of each subject person, and the target arousal level grasping unit 62 grasps a range of the target arousal level of each subject person. Further, the target arousal level change amount grasping unit 63 grasps a target amount of change (ΔA) in the arousal level of each subject person from the current arousal level of the subject person grasped by the current arousal level grasping unit 61 and the range of the target arousal level of the subject person grasped by the target arousal level grasping unit 62.

In step S12, the control identifying unit 80 identifies control contents performed by the air conditioner 10 and the lighting apparatus 20 on the basis of the target amounts of changes (ΔA) in the arousal levels of respective subject persons grasped in step S11 and the response characteristics data stored in the response characteristics data unit 73.

In step S13, the control performing unit 90 transmits the control contents identified by the control identifying unit 80 to the air conditioner 10 and the lighting apparatus 20 which are pieces of environmental equipment of the environmental equipment control system 1 to cause the air conditioner 10 and the lighting apparatus 20 to perform the control contents.

In step S14, the control performing unit 90 determines whether a predetermined time period has passed since the control contents are performed in step S13. Here, if it is determined that the predetermined time period has passed, the process proceeds to step S15. If the predetermined time period has not passed, the arousal level control performed in step S13 is continued.

In step S15, the control performing unit 90 ends the arousal level control and causes the air conditioner 10 and the lighting apparatus 20 to restart the control based on the set temperature and the set illuminance used before the arousal level control is performed.

(4) Features of Embodiment

(4-1)

In the case where a plurality of kinds of environmental stimuli such as a temperature stimulus provided by the air conditioner 10 and an illuminance stimulus provided by the lighting apparatus 20 are provided to a space where a plurality of subject persons are present, how the subject persons feel the environmental stimuli may vary from subject person to subject person. Therefore, even if the arousal level of a specific subject person can be made preferable, the arousal levels of the subject persons other than the specific subject person may not be made preferable at the same time.

In contrast, the environmental equipment control apparatus 100 according to the present embodiment controls a plurality of kinds of environmental equipment such as the air conditioner 10 and the lighting apparatus 20 using response characteristics data in which how individual subject persons feel each of the plurality of environmental stimuli is reflected.

Therefore, even if subject persons who feel environmental stimuli differently are present in the same space, the environmental equipment control apparatus 100 can identify and perform control contents that can make the arousal levels of the individual subject persons preferable in consideration of the response characteristics data.

(4-2)

For example, suppose that a subject person who hardly feels a specific environmental stimulus and easily feels the other environmental stimulus (for example, a subject person who hardly feels a stimulus caused by temperature control of the air conditioner 10 and easily feels a stimulus caused by illuminance control of the lighting apparatus 20) and a subject person who easily feels the specific environmental stimulus and hardly feels the other environmental stimulus (for example, a subject person who easily feels the stimulus caused by temperature control of the air conditioner 10 and hardly feels the stimulus caused by illuminance control of the lighting apparatus 20) are present in the same space. In such a case, if only the specific environmental stimulus (the stimulus caused by temperature control performed by the air conditioner 10), that is, only one kind of the environmental stimulus can be supplied, it is difficult to make the comfort of both the subject persons preferable.

In contrast, the environmental equipment control apparatus 100 according to the present embodiment handles a plurality of kinds of environmental stimuli, which can be provided to the individual subject persons and the degrees of which are controllable, such as a temperature stimulus provided by the air conditioner 10, an illuminance stimulus provided by the lighting apparatus 20, and a combination of the temperature stimulus provided by the air conditioner 10 and the illuminance stimulus provided by the lighting apparatus 20, in the environmental equipment control system 1 capable of providing the plurality of kinds of environmental stimuli by using the air conditioner 10, the lighting apparatus 20, and so forth. Therefore, the environmental equipment control apparatus 100 is more likely to make the arousal levels of a plurality of subject persons preferable at that same time and can perform control so that all the subject persons have the arousal levels that are in the respective target ranges.

(4-3)

The environmental equipment control apparatus 100 according to the present embodiment can receive response characteristics data from the outside, receive response characteristics data via a recording medium, or the like and store the response characteristics data in the response characteristics data unit 73 and can use the response characteristics data in identification of control contents of arousal level control. Thus, the environmental equipment control apparatus 100 can easily grasp response characteristics data.

(5) Modifications

(5-1) Modification A

In the embodiment described above, the case where the target arousal levels of a plurality of subject persons who are present in a room vary from subject person to subject person has been described by way of example.

However, for example, the processing may be simplified by setting the same target arousal level range that is applicable to all the subject persons instead of setting the target arousal levels for the respective subject persons, for example. In this case, the target arousal level change amount grasping unit 63 grasps, for each subject person, a target amount of change in the arousal level which is a difference between the current arousal level of the subject person grasped by the current arousal level grasping unit 61 and the target arousal level range that is common to all the subject persons.

(5-2) Modification B

In the embodiment described above, the case where the arousal level of a subject person is estimated on the basis of content detected by the electrocardiographic waveform sensor 41 serving as the biological sensor 40 and each environmental equipment is controlled so that the arousal level becomes the target arousal level has been described by way of example.

However, the target to be controlled is not limited to the arousal level of a subject person, and may be, for example, mental or physical state information other than the arousal level or may be biological state information.

Among these, the mental or physical state information is secondary information estimated from primary information such as a heartbeat obtained by performing a measurement on a subject person, and includes, for example, information such as the arousal level, the concentration level, the nervousness level, the resting level, and an autonomic nerve balance index such as LF/HF. Estimation of these can be performed by applying a known relationship to primary information obtained using a known measurement apparatus. Note that LF/HF refers to an index of sympathetic nervous system activity calculated on the basis of a heartbeat pattern or a pulsation pattern.

In addition, the biological state information refers to primary information obtained by performing a measurement on a subject person by using a measurement apparatus and includes, for example, information such as a heartbeat, body temperature, an amount of sweat, and voice. These can be measured using a known measurement apparatus. Note that, as for the heartbeat, information of a heartrate per unit time or a change in the heartrate is exemplified, for example. In addition, as for the voice, information of the volume of the voice, a change in the frequency, or the like is exemplified.

In addition, in the embodiment described above, the case where the arousal level of a subject person is estimated from electrocardiographic waveform data of the subject person has been described by way of example. However, for example, the arousal level may be estimated on the basis of a respiration rate of a subject person per unit time, or the arousal level may be estimated on the basis of an electroencephalogram of a subject person. Alternatively, the arousal level may be estimated on the basis of a combination of the electrocardiographic waveform data, the respiration rate per unit time, and the electroencephalogram.

(5-3) Modification C

In the embodiment described above, the air conditioner 10 that performs temperature control and the lighting apparatus 20 that performs illuminance control that is a kind different from the kind of temperature control have been described as pieces of environmental equipment serving as a plurality of kinds of environment control means by way of example.

However, the plurality of kinds of environment control means need not be constituted by a plurality of kinds of apparatuses. For example, if an air conditioner that is the single apparatus is capable of implementing temperature control, humidity control and wind velocity control, the temperature control may be treated as one kind of environment control means, the humidity control may be treated as another kind of environment control means, and the wind velocity control may be treated as still another kind of environment control means.

In this case, characteristics of changes in the arousal levels of each subject person in response to a temperature change, a humidity change, and a wind velocity change are grasped as response characteristics data, and the arousal level control is performed using the air conditioner.

(5-4) Modification D

In the embodiment described above, the air conditioner 10 that performs temperature control and the lighting apparatus 20 that performs illuminance control have been described as pieces of environmental equipment serving as environment control means by way of example.

However, the environmental equipment serving as environment control means is not limited to this.

For example, a ventilation apparatus capable of adjusting the carbon dioxide concentration in a room by ventilating air in the room where a subject person is present may be used as the environmental equipment serving as the environment control means. For example, the ventilation apparatus detects the carbon dioxide concentration in the room using a carbon dioxide concentration sensor and controls an amount of ventilation in accordance with the detected concentration to adjust the carbon dioxide concentration in the room. In this manner, the ventilation apparatus can change the arousal level of each subject person.

In addition, a deodorant apparatus capable of decreasing the concentration of an odor component in a room where a subject person is present may be used as the environmental equipment serving as the environment control means. For example, the deodorant apparatus detects the concentration of the odor component in the room using an odor concentration sensor and controls an amount of deodorant agent to be atomized in accordance with the detected concentration to adjust the concentration of the odor component in the room. In this manner, the deodorant apparatus can change the arousal level of each subject person.

In addition, an audio apparatus capable of changing a sound environment in a room where a subject person is present may be used as the environmental equipment serving as the environment control means. For example, the audio apparatus selectively plays up-tempo music or slow-tempo music that is provided in advance. In this manner, the audio apparatus can change the arousal level of each subject person.

Note that in the embodiment described above, an apparatus capable of adjusting illuminance is described as the lighting apparatus 20 by way of example. However, as the lighting apparatus, an apparatus capable of adjusting the flux of light, an apparatus capable of adjusting the luminous intensity, an apparatus capable of adjusting the brightness, and an apparatus capable of adjusting the color of light (lightbulb color, white color, or daylight color) or the like may be used.

(5-5) Modification E

In the embodiment described above, the case where the environmental equipment control apparatus 100 receives the response characteristics data created outside the environmental equipment control apparatus 100 to grasp the response characteristics data has been described by way of example.

Figure 5:
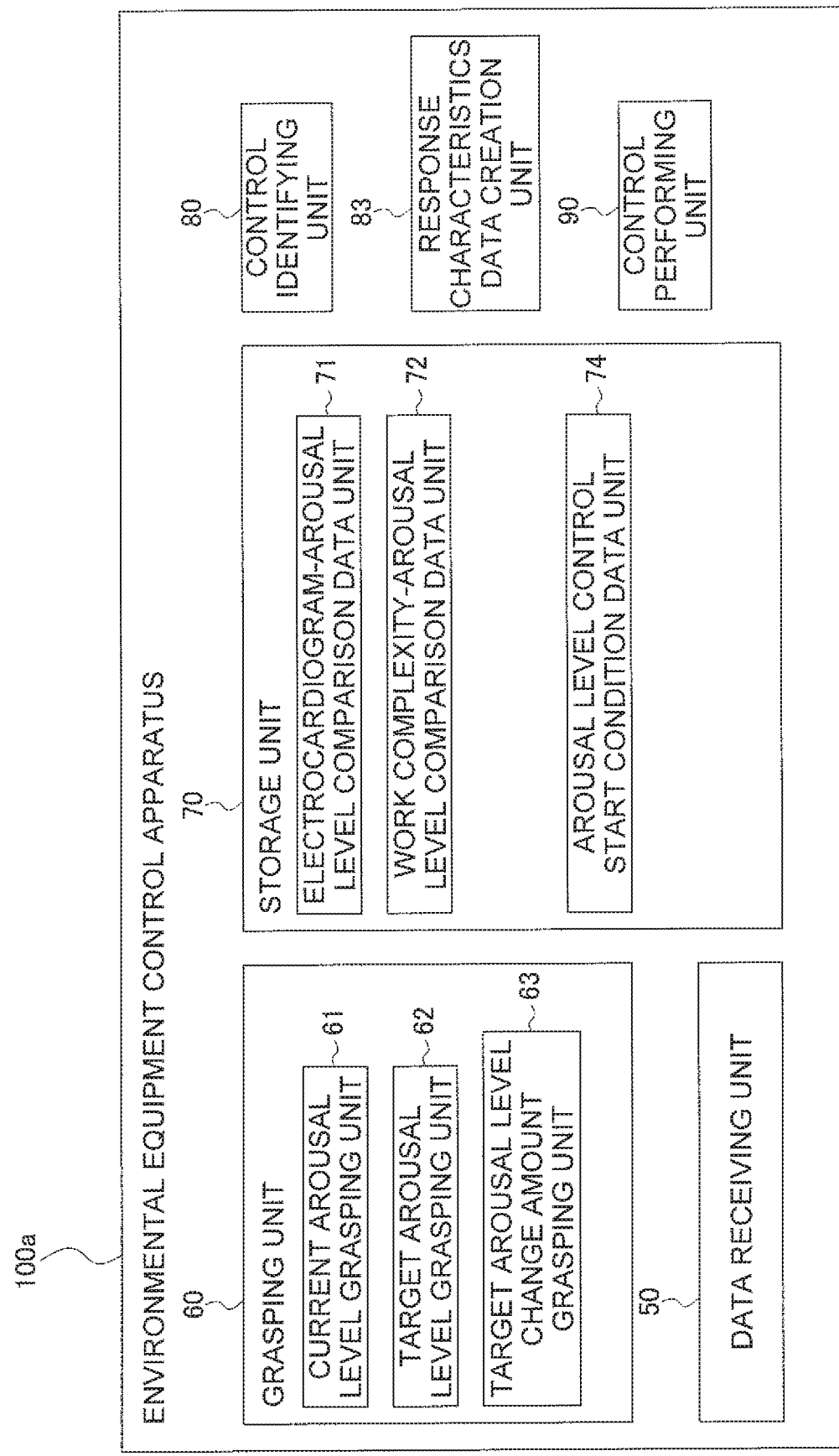
FIG. 5 is a block diagram of a configuration of an environmental equipment control apparatus according to a modification D.

However, the environmental equipment control apparatus 100 may include a response characteristics data creation unit 83 that creates the response characteristics data by itself in place of the response characteristics data unit 73, as illustrated in FIG. 5.

The response characteristics data creation unit 83 obtains information on an actual change in the arousal level (response information) of each subject person in the case where the control state of the environment control means is actually changed through control of the environmental equipment serving as the environment control means, in association with the control state of the environment control means and/or a change in the control state. In this manner, the response characteristics data creation unit 83 creates the response characteristics data.

The method for creating the response characteristics data is not limited. For example, one kind of environmental equipment serving as the environment control means is caused to perform control for changing the setting by a unit amount (the air conditioner 10 is caused to perform control for decreasing the set temperature by 1 degree, which is a unit amount), and a change in the arousal level of each subject person that occurs at that time is created as the response characteristics data of the subject person to the unit temperature stimulus. By performing this processing while changing the kind of the environmental equipment (or the kind of the environmental stimulus), the response characteristics data may be completed. In addition, for example, data associating changes in the arousal levels of individual subject persons in response to control performed on any environmental equipment among pieces of environmental equipment serving as environment control means may be accumulated, and the response characteristics data may be created on the basis of the accumulated data.

In addition, for example, in the case where information used for creating response characteristics data of subject persons (for example, information indicating response characteristics of the individual subject persons to various stimuli) is received via the setting receiving unit 14 of the air conditioning controller 13 or the data receiving unit 50 of the environmental equipment control apparatus 100, the response characteristics data creation unit 83 may create the response characteristics data for all the subject persons on the basis of the received information.

(5-6) Modification F

In the modification E described above, the case where the response characteristics data creation unit 83 determines response characteristics to individual environmental stimuli for all the subject persons has been described by way of example.

However, for example, when there are subject persons having a specific similarity relationship among a plurality of subject persons who are present in the same room, the response characteristics data creation unit 83 may examine and determine response characteristics of a specific person to individual environmental stimuli among the plurality of subject persons who satisfy the similarity relationship, and applies the response characteristics determined for the specific person similarly to the other subject persons who satisfy the similarity relationship without performing examining work. In this manner, the response characteristics data creation unit 83 may grasp the response characteristics data for all the plurality of subject persons who satisfy the similarity relationship.

Thus, the load for determining the response characteristics can be suppressed to be small, compared with the case where the response characteristics to the individual environmental stimuli are examined for all the subject persons who are present in a room.

The method for determining whether the aforementioned similarity relationship is satisfied is not limited. For example, the similarity relationship may be determined using information received from each subject person by the setting receiving unit 14 of the air conditioning controller 13 or the data receiving unit 50 of the environmental equipment control apparatus 100. For example, the setting receiving unit 14 of the air conditioning controller 13 or the data receiving unit 50 of the environmental equipment control apparatus 100 may provide response levels corresponding to a plurality of steps determined in advance for individual environmental stimuli and may receive selective input from each subject person. In this case, subject persons having substantially the same degree of response to the same environmental stimulus are identified as persons who satisfy the similarity relationship on the basis of information received from the individual subject persons. In this manner, the load for determining response characteristics to the environmental stimulus may be reduced.

In addition, for example, the setting receiving unit 14 of the air conditioning controller 13 or the data receiving unit 50 of the environmental equipment control apparatus 100 may receive information on the age of each subject person from the subject person. If subject persons satisfy a predetermined same age range condition, it may be estimated that the response characteristics to each environmental stimulus satisfy the similarity relationship. In this manner, the load for determining response characteristics to each environmental stimulus may be reduced.

In addition, the response characteristics data creation unit 83 may create the response characteristics data by using accumulated information obtained by accumulating, in association with control that is performed, response characteristics of individual subject persons in the case where a stimulus is given to the individual subject persons as a result of the control performed by the control performing unit 90. In this case, the response characteristics data creation unit 83 may first create the response characteristics data of a specific subject person using the accumulated information. For other subject persons having the similarly to the specific subject person for whom the response characteristics data is created, the response characteristics data creation unit 83 may omit creation of the response characteristics data using the accumulated information of the other subject persons, by applying the created response characteristics data to the other subject persons.

Further, in the case where the setting receiving unit 14 of the air conditioning controller 13 or the data receiving unit 50 of the environmental equipment control apparatus 100 receives information used for creating the response characteristics data of a subject person (for example, information indicating response characteristics of a subject person to various stimuli) for at least one subject person, the response characteristics data creation unit 83 may create the response characteristics data for the at least one subject person for whom the information is received and subject persons having a similarity to the some subject persons. In this manner, the load for creating the response characteristics data may be reduced. Note that the response characteristics data may be created for the other subject persons appropriately using the accumulated information in a manner as described above.

(6) Embodiment According to Appendix

An environmental equipment control system in which a control apparatus according to one embodiment of an appendix will be described below.

Figure 6:
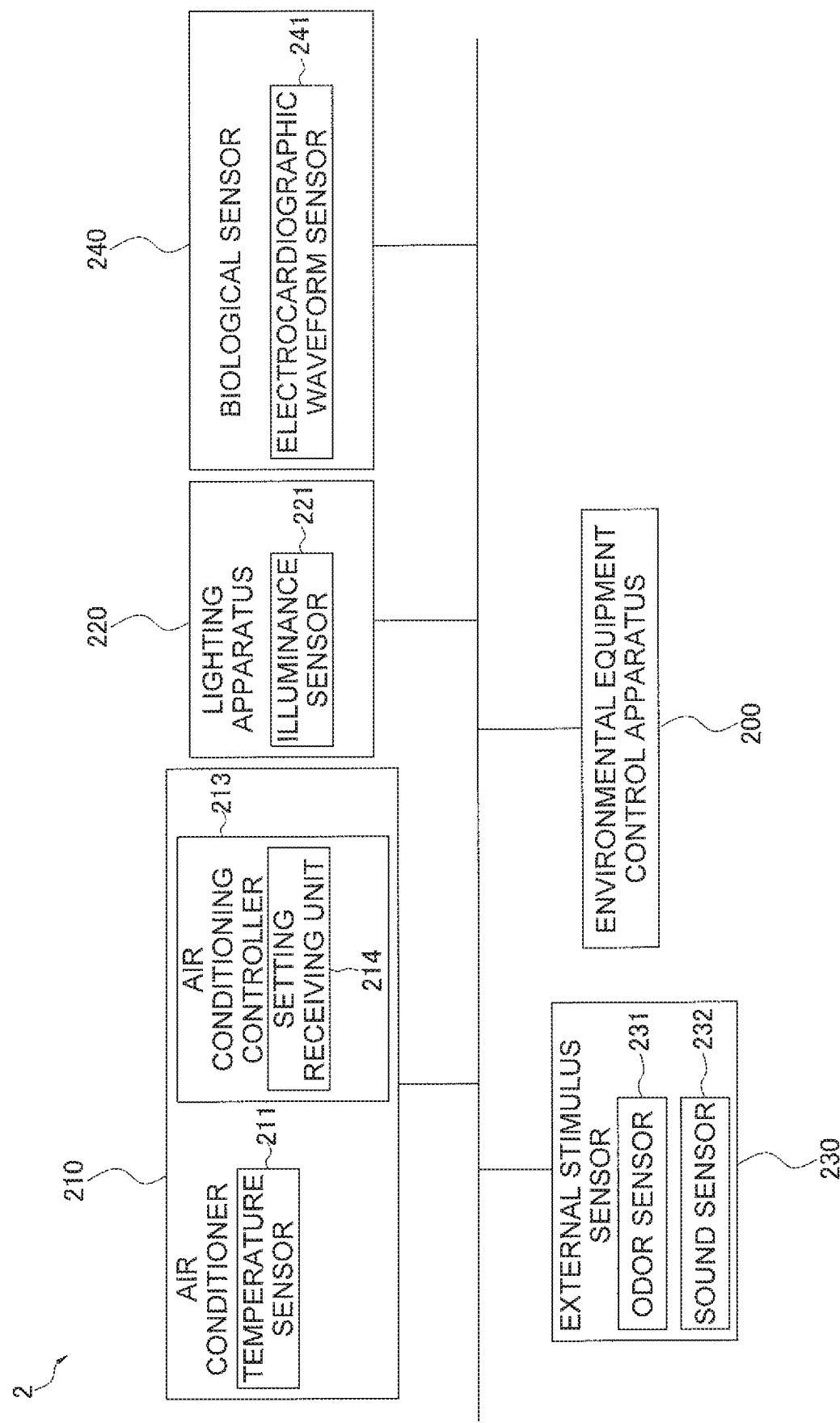
FIG. 6 is a diagram of a schematic configuration of the entirety of an environmental equipment control system according to an appendix.

(7) Schematic Configuration of Entirety of Environmental Equipment Control System According to Appendix FIG. 6 is a diagram illustrating a schematic configuration of the entirety of an environmental equipment control system 2.

The environmental equipment control system 2 is a system that uses a plurality of kinds of environmental equipment to suppress an influence of an external stimulus, which is a stimulus other than environmental stimuli caused by the plurality of kinds of environmental equipment, on the arousal level of a subject person to be small.

The environmental equipment control system 2 mainly includes an air conditioner 210, a lighting apparatus 220, an external stimulus sensor 230, a biological sensor 240, and an environmental equipment control apparatus 200. These apparatuses are connected to each other with a cable or wirelessly to be able to communicate with each other.

The air conditioner 210 and the lighting apparatus 220 are pieces of environmental equipment of kinds different from each other and are pieces of equipment capable of controlling the arousal level of a subject person.

The air conditioner 210 is an apparatus capable of adjusting the temperature in a room where a subject person is present, and includes an refrigerant circuit capable of implementing a refrigeration cycle in which a compressor, a condenser, an expansion valve, and an evaporator are connected as a result of connection of an outdoor unit and an indoor unit which are not illustrated. The air conditioner 210 includes a temperature sensor 211 that detects the air temperature in a room, and an air conditioning controller 213 that performs various kinds of air conditioning control such as a cooling operation and a heating operation. Note that the air conditioning controller 213 includes a CPU, a ROM, a RAM, and so forth.

This air conditioning controller 213 includes a setting receiving unit 214 that receives instructions of various air conditioning control modes such as a cooling operation and a heating operation and instructions of a set temperature and a set airflow from the subject person.

As described later, the air conditioner 210 performs various air conditioning control modes at the set airflow so that the temperature detected by the temperature sensor 211 becomes the set temperature in normal air conditioning control in which cancelling control for suppressing an external stimulus is not performed.

The lighting apparatus 220 is an apparatus capable of adjusting the illuminance in a room where a subject person is present, and includes a light emitter such as an LED whose illuminance is controllable and an illuminance sensor 221 disposed at a predetermined position in the room. As described later, the lighting apparatus 220 performs control so that the illuminance in the room detected by the illuminance sensor 221 becomes predetermined target illuminance in normal illuminance control in which cancelling control for suppressing an external stimulus is not performed.

The external stimulus sensor 230 detects external stimuli that are environmental stimuli other than the environmental stimuli given as a result of control of the air conditioner 210 and the lighting apparatus 220 which are environment control means, among environmental stimuli given to a subject person. In the present embodiment, the external stimulus sensor 230 includes an odor sensor 231 and a sound sensor 232. The odor sensor 231 detects the concentration of an odor component in a room. Kinds of the odor component detected by the odor sensor 231 are not limited. The odor sensor 231 may be configured to detect predetermined kinds of odor component (such as a mercaptan group such as methyl mercaptan, a sulfur compound such as hydrogen sulfide, ammonia, nonenal, trimethylamine, acetaldehyde, geosmin, and acetic acid). The sound sensor 232 detects sound in a room. The sound sensor 232 is not limited. For example, a sound collecting microphone or the like is used. Detection data obtained by the odor sensor 231 and the sound sensor 232 of the external stimulus sensor 230 is transmitted to the environmental equipment control apparatus 200.

The biological sensor 240 is a sensor for grasping the arousal level of a subject person, and includes an electrocardiographic waveform sensor 241 that detects an electrocardiographic waveform of a subject person in the present embodiment. The electrocardiographic waveform sensor 241 is attached near the heart of a subject person for use, and is capable of wirelessly transmitting data of the detected electrocardiographic waveform to a peripheral device such as the environmental equipment control apparatus 200.

As described later, the environmental equipment control apparatus 200 is an apparatus that receives the detection data from the external stimulus sensor 230 to grasp the external stimuli currently given to a subject person in the room, that receives the data of the electrocardiographic waveform from the biological sensor 240 to estimate the arousal level of the subject person, and that controls the air conditioner 210 and the lighting apparatus 220 which are various kinds of environmental equipment to cancel or reduce, if the arousal level of the subject person is adversely influenced by the external stimuli, the adverse influence.

Figure 7:
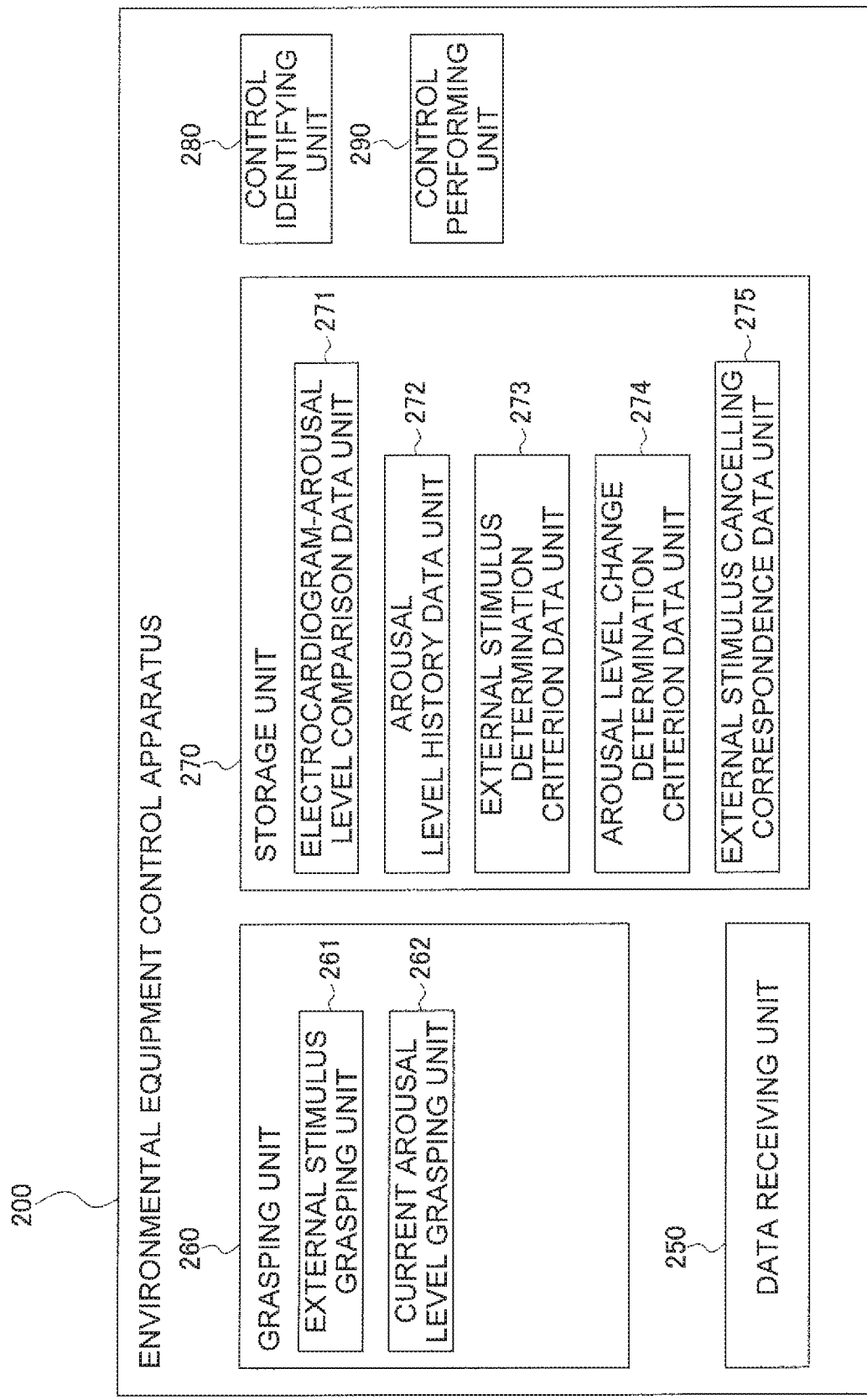
FIG. 7 is a block diagram of a configuration of an environmental equipment control apparatus according to the appendix.

(8) Configuration of Environmental Equipment Control Apparatus 200 According to Appendix FIG. 7 is a block diagram illustrating a functional configuration of the environmental equipment control apparatus 200.

The environmental equipment control apparatus 200 includes a data receiving unit 250 for receiving various kinds of information, a grasping unit 260 for grasping various kinds of information, a storage unit 270 for storing various kinds of data, a control identifying unit 280 that determines control to be performed by each environmental equipment, and a control performing unit 290 that causes the control identified by the control identifying unit 280 to be performed. This environmental equipment control apparatus 200 is capable of acquiring information transmitted from the external stimulus sensor 230, the biological sensor 240, and the setting receiving unit 214 of the air conditioning controller 213 and of controlling the air conditioner 210 and the lighting apparatus 220. The environmental equipment control apparatus 200 includes one or a plurality of CPUs, a ROM, and a RAM.

(8-1) Data Receiving Unit 250

The data receiving unit 250 is configured to be capable of receiving data transmitted from the setting receiving unit 214 of the air conditioning controller 213, receiving detection data obtained by the odor sensor 231 and the sound sensor 232 and transmitted from the external stimulus sensor 230, and receiving data of an electrocardiographic waveform transmitted from the biological sensor 240.

The data received by the data receiving unit 250 can be referred to by each unit of the environmental equipment control apparatus 200.

(8-2) Grasping Unit 260

The grasping unit, or receiver, 260 includes an external stimulus grasping unit, or receiver, 261, a current arousal level grasping unit, or receiver, 262, and so forth. The grasping unit 260 is constituted by one or a plurality of CPUs, a RAM, and so forth.

The external stimulus grasping unit 261 grasps detection data of the odor sensor 231 and detection data of the sound sensor 232, which are received by the data receiving unit 250 from the external stimulus sensor 230. That is, the external stimulus grasping unit 261 grasps data of the current indoor odor and sound that are detected by the odor sensor 231 and the sound sensor 232, respectively.

The current arousal level grasping unit 262 grasps the current arousal level of a subject person in consideration of an electrocardiogram-arousal level comparison data unit 271 stored in the storage unit 270 described later, on the basis of the content detected by the electrocardiographic waveform sensor 241 for the subject person and received by the data receiving unit 250 from the biological sensor 240. Note that the current arousal level grasping unit 262 stores, as arousal level history data, the grasped current arousal level of a subject person in an arousal level history data unit 272 of the storage unit 270 described later.

(8-3) Storage Unit 270

The storage unit 270 includes the electrocardiogram-arousal level comparison data unit 271, the arousal level history data unit 272, an external stimulus determination criterion data unit 273, an arousal level change determination criterion data unit 274, an external stimulus cancelling correspondence data unit 275, and so forth. The storage unit 270 is constituted by one or a plurality of ROMs, RAMs, or the like.

As described above, the electrocardiogram-arousal level comparison data unit 271 stores in advance data for grasping the arousal level estimated from the content detected by the electrocardiographic waveform sensor 241 of the biological sensor 240. A relationship between the electrocardiographic waveform and the arousal level is determined based on known matters. For example, the arousal level of a subject person may be grasped by identifying the arousal level corresponding to the electrocardiographic waveform grasped by the electrocardiographic waveform sensor 241 with reference to the data of the relationship between the electrocardiographic waveform and the arousal level that is stored in advance.

The arousal level history data unit 272 stores history data of the arousal level of a subject person. As described above, the current arousal level of a subject person grasped by the current arousal level grasping unit 262 is sequentially stored by the current arousal level grasping unit 262. In this manner, the arousal level history data unit 272 is in a state in which the history data of the arousal level is stored.

The external stimulus determination criterion data unit 273 stores information serving as a determination criterion used in checking a predetermined external stimulus degree condition, based on which cancelling control described later is to be performed. By providing the external stimulus degree condition in this manner, it is determined that a small degree of stimulus among external stimuli grasped by the external stimulus grasping unit 261 does not satisfy the external stimulus degree condition, so that cancelling control is not to be performed.

The arousal level change determination criterion data unit 274 stores information serving as a determination criterion used in checking a predetermined arousal level change degree condition, based on which cancelling control described later is to be performed. By providing the arousal level change degree condition of a subject person in this manner, it is determined that the arousal level change degree condition is not satisfied when a change in the arousal level of the subject person is small, so that cancelling control is not to be performed.

The external stimulus cancelling correspondence data unit 275 stores information of environmental equipment for use in cancelling control for suppressing an influence on a subject person in association with each kind of external stimulus. In the present embodiment, performing cancelling control through temperature control using the air conditioner 210 among pieces of environmental equipment in the case where it is expected that a stimulus relating to sound is given to a subject person and performing cancelling control through illuminance control using the lighting apparatus 220 among pieces of environmental equipment in the case where it is expected that a stimulus relating to odor is given to a subject person are stored. In addition, the external stimulus cancelling correspondence data unit 275 further stores a relationship between an amount of increase in the arousal level per unit time and an amount of change in the set temperature so that in the case where cancelling control is performed through temperature control using the air conditioner 210, the greater the amount of increase in the arousal level per unit time at the time when the external stimulus degree condition is satisfied, the greater the amount of change in the set temperature of the air conditioner 210 (for example, so that the amount of increase in the set temperature increases when a subject person is likely to be aroused excessively by relatively loud noise in a situation in which the air conditioner 210 is performing a heating operation). In addition, similarly, the external stimulus cancelling correspondence data unit 275 stores a relationship between an amount of increase in the arousal level per unit time and an amount of decrease in the set illuminance so that in the case where cancelling control is performed through illuminance control using the lighting apparatus 220, the greater the amount of increase in the arousal level per unit time at the time when the external stimulus degree condition is satisfied, the greater the amount of change in the set illuminance of the lighting apparatus 220 (for example, so that the amount of decrease in the set temperature increases when a subject person is likely to be aroused excessively by relatively strong odor).

(8-4) Control Identifying Unit 280

The control identifying unit 280 identifies specific contents of cancelling control on the basis of data stored in the external stimulus cancelling correspondence data unit 275 of the storage unit 270. The control identifying unit 280 includes one or a plurality of CPUs, a RAM, and so forth.

(8-5) Control Performing Unit 290

As described above, the control performing unit 290 causes cancelling control identified by the control identifying unit 280 to be performed. The control performing unit 290 is constituted by one or a plurality of CPUs, a RAM, and so forth. Specifically, the control performing unit 290 transmits the contents of cancelling control identified by the control identifying unit 280 to the air conditioner 210 and the lighting apparatus 220 which are pieces of environmental equipment of the environmental equipment control system 2 to cause the air conditioner 210 and the lighting apparatus 220 to perform the cancelling control.

Figure 8:
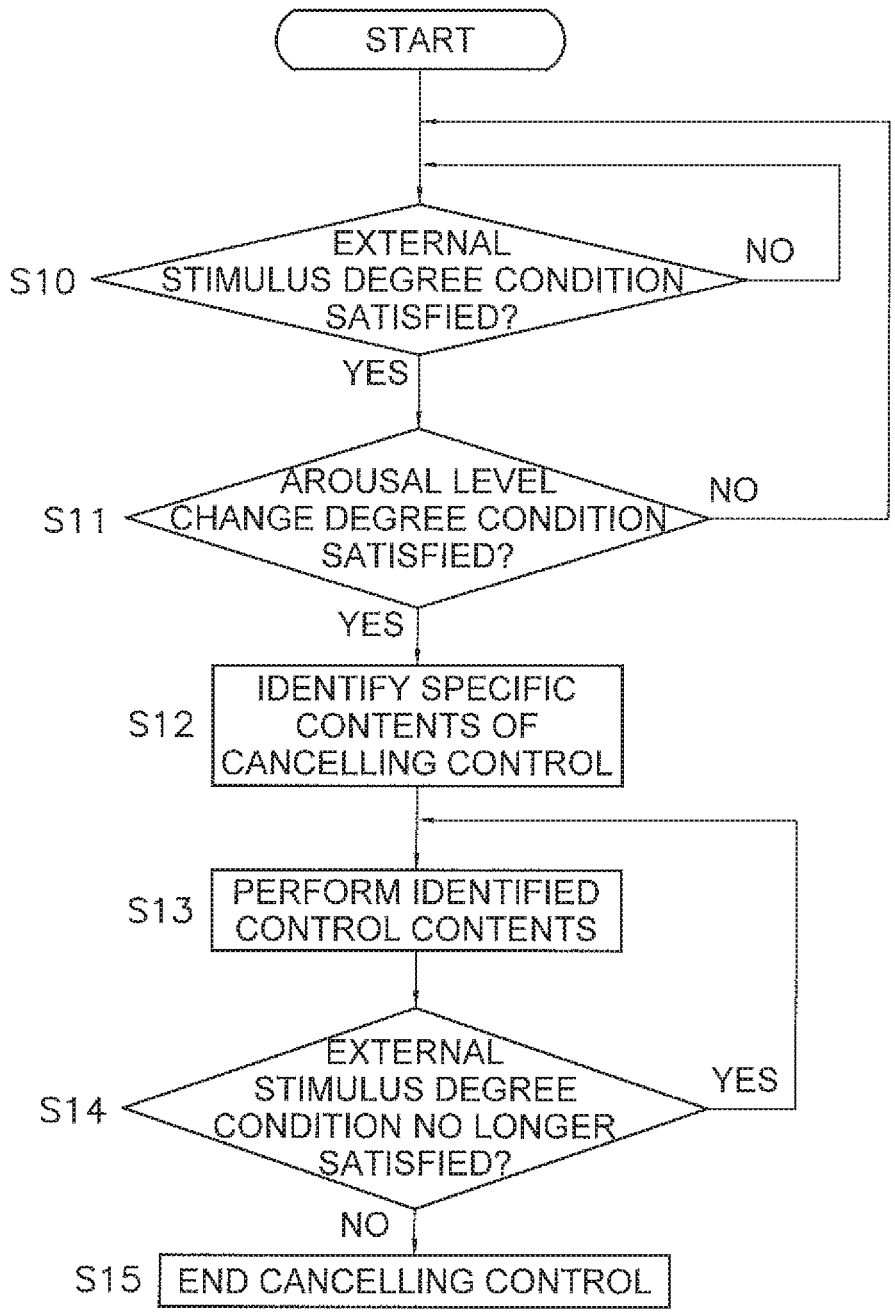
FIG. 8 is a flowchart of a process performed by the environmental equipment control apparatus according to the appendix.

(9) Process by Environmental Equipment Control Apparatus 200 According to Appendix FIG. 8 is a flowchart of a process performed by the environmental equipment control apparatus 200.

Here, description will be given of the case where cancelling control is started in response to satisfaction of the condition for starting cancelling control, that is, in response to both the external stimulus degree condition and the arousal level change degree condition being satisfied from a state before the cancelling control is performed, that is, from a state in which the air conditioner 210 and the lighting apparatus 220 are controlled on the basis of the set temperature and the set illuminance, respectively.

In step S10, the control identifying unit 280 determines whether the external stimulus degree condition is satisfied. Specifically, it is determined whether the current concentration of the odor component or the current volume of sound grasped by the external stimulus grasping unit 261 satisfies the external stimulus degree condition stored in the external stimulus determination criterion data unit 273, specifically, whether the concentration of the odor component is higher than or equal to a predetermined concentration and whether the volume of sound is higher than or equal to a predetermined value. Here, if it is expected that a large stimulus is given to the subject person as a result of the concentration of the odor component being higher than or equal to the predetermined concentration or the volume of sound being higher than or equal to the predetermined value, it is determined that the external stimulus degree condition is satisfied. Here, if it is determined that the external stimulus degree condition is satisfied, the process proceeds to step S11. Therefore, the state in which the air conditioner 210 and the lighting apparatus 220 are controlled on the basis of the set temperature and the set illuminance, respectively, is continued until it is determined that the external stimulus degree condition is satisfied.

In step S11, the control identifying unit 280 determines whether the arousal level of the subject person satisfies the arousal level change degree condition. Specifically, the control identifying unit 280 first refers to the history data of the arousal level of the subject person stored in the arousal level history data unit 272 to grasp an amount of change in the arousal level of the subject person per unit time (an amount of increase in the arousal level per unit time in the present embodiment) at the time when it is expected that a large stimulus is given to the subject person in step S10. Then, it is determined whether the grasped amount of increase in the arousal level per unit time satisfies the arousal level change degree condition stored in the arousal level change determination criterion data unit 274, specifically, whether the grasped amount of increase in the arousal level per unit time is greater than or equal to a predetermined value. Here, if the grasped amount of increase in the arousal level per unit time is greater than or equal to the predetermined value, it is determined that the arousal level change degree condition is satisfied. Here, if it is determined that the arousal level change degree condition is satisfied, the process proceeds to step S12. If it is not determined that the arousal level change degree condition is satisfied, the process returns to step S10 in which the state in which the air conditioner 210 and the lighting apparatus 220 are controlled on the basis of the set temperature and the set illuminance, respectively, is continued.

In step S12, the control identifying unit 280 identifies specific contents of cancelling control on the basis of the data stored in the external stimulus cancelling correspondence data unit 275. Specifically, the control identifying unit 280 refers to the data stored in the external stimulus cancelling correspondence data unit 275 to identify a kind of environmental equipment for use in the cancelling control in accordance with a kind of the external stimulus that satisfies the external stimulus degree condition in step S10. That is, if the external stimulus degree condition is satisfied as a result of the volume of sound being higher than or equal to the predetermined value in step S10, the control identifying unit 280 identifies the air conditioner 210 as environmental equipment for use in the cancelling control. If the external stimulus degree condition is satisfied as a result of the concentration of the odor component being higher than or equal to the predetermined concentration, the control identifying unit 280 identifies the lighting apparatus 220 as environmental equipment for use in the cancelling control. Then, the control identifying unit 280 refers to the data stored in the external stimulus cancelling correspondence data unit 275 to identify, as contents of the cancelling control, an amount of increase in the set temperature of the air conditioner 210 or an amount of decrease in the set illuminance of the lighting apparatus 220 corresponding to the amount of increase in the arousal level per unit time at the time when the external stimulus degree condition is satisfied. After the specific contents of the cancelling control are identified in the above-described manner, the process proceeds to step S13.

In step S13, the control performing unit 290 transmits the contents of the cancelling control identified by the control identifying unit 280 to the air conditioner 210 and the lighting apparatus 220 which are pieces of environmental equipment of the environmental equipment control system 2 to cause the air conditioner 210 and the lighting apparatus 220 to perform the cancelling control.

In step S14, the control performing unit 290 determines whether the external stimulus degree condition that is satisfied in step S10 is no longer satisfied. That is, if the external stimulus degree condition is satisfied as a result of the concentration of the odor component being higher than or equal to the predetermined concentration in step S10, the control performing unit 290 determines whether the concentration of the odor component is lower than the predetermined concentration. If the external stimulus degree condition is satisfied as a result of the volume of sound being higher than or equal to the predetermined value in step S10, the control performing unit 290 determines whether the volume of sound is less than the predetermined value. Here, if it is determined that the external stimulus degree condition is no longer satisfied, the process proceeds to step S15. Note that if it is determined that the external stimulus degree condition is still satisfied, the cancelling control is continued.

In step S15, the control performing unit 290 ends the cancelling control and causes the air conditioner 210 and the lighting apparatus 220 to restart the control based on the set temperature and the set illuminance used before the cancelling control is performed.

(10) Features of Embodiment According to Appendix (10-1)

If there is a change relating to an environmental stimulus controllable using environmental equipment included in the environmental equipment control system, an environment desired by a subject person can be implemented by control of the environmental equipment. For example, the air conditioner 210 performs air conditioning control so that the air temperature in a room becomes equal to the set temperature. Even if an unintended environmental stimulus is given to a subject person as a result of an unintended increase in the temperature in the room, the air conditioner 210 performs control to keep the air temperature in the room at the set temperature. In addition, for example, the lighting apparatus 220 performs illuminance control so that the illuminance in a room becomes equal to the set illuminance. Even if an unintended environmental stimulus is given to a subject person as a result of the sunlight becomes too strong because of a change in weather or the like, the lighting apparatus 220 performs control to keep the illuminance in the room at the set illuminance. In this manner, even if a change relating to an environmental stimulus controllable using environmental equipment included in the environmental equipment control system occurs, the environment can be controlled by the environmental equipment so that the change caused by the environmental stimulus is eliminated.

However, if an unintended external stimulus that is a stimulus other than environmental stimuli controllable by environmental equipment included in the environmental equipment control system 2 occurs, the environment cannot be controlled so that the environmental stimulus is eliminated through control of the environmental equipment. For this reason, there may occur an inconvenience such as an excessive increase in the arousal level (an excessive arousal state), for example, a subject person who is present in a room being too nervous or annoyed by the unintended external stimulus.

In contrast, even if an untended external stimulus (stimulus caused by sound or odor in the example described above) occurs which is a stimulus other than a stimulus of a temperature change caused by the air conditioner 210 and a stimulus of an illuminance change caused by the lighting apparatus 220 which are pieces of environmental equipment included in the environmental equipment control system 2, the environmental equipment control apparatus 200 according to the present embodiment performs cancelling control such as changing the set temperature of the air conditioner 210 or changing the set illuminance of the lighting apparatus 220. In this manner, the environmental equipment control apparatus 200 suppresses a decrease in concentration due to an excessive increase in the arousal level of the subject person.

As described above, even if an external stimulus itself cannot be eliminated through control of environmental equipment, the increasing degree of the arousal level due to the external stimulus can be suppressed to be small. This prevents the subject person from being excessively aroused even if an unintended external stimulus occurs, and a decrease in concentration is avoided. Consequently, the work efficiency of the subject person can be maintained high.

(10-2)

The environmental equipment control system 2 includes a plurality of kinds of environmental equipment (the air conditioner 210 and the lighting apparatus 220), and the environmental equipment control apparatus 200 according to the present embodiment performs cancelling control by controlling a kind of environmental equipment that is determined in advance to be capable of efficiently suppressing an influence of a stimulus depending on a kind of the stimulus expected to be given to the subject person.

Therefore, the degree by which the arousal level of the subject person is changed by an external stimulus can be suppressed to be smaller than in the case where only one kind of environmental equipment is provided.

(10-3)

The environmental equipment control apparatus 200 according to the present embodiment does not perform cancelling control for all external stimuli grasped by the external stimulus grasping unit 261 but causes cancelling control to be performed only when the degree of an external stimulus grasped by the external stimulus grasping unit 261 satisfies the external stimulus degree condition. Therefore, a situation in which the temperature or the illuminance deviates from the set temperature or the set illuminance as a result of cancelling control being performed more than necessary can be suppressed to a minimum.

Further, even if the degree of an external stimulus grasped by the external stimulus grasping unit 261 satisfies the external stimulus degree condition, the environmental equipment control apparatus 200 does not perform cancelling control unless the arousal level of the subject person is actually excessively increased by the external stimulus (further unless the arousal level change degree condition is satisfied). Therefore, a situation in which the temperature or the illuminance deviates from the set temperature or the set illuminance can be further suppressed by performing cancelling operation only when the cancelling control is necessary for the subject person.

(10-4)

The environmental equipment control apparatus 200 according to the present embodiment starts cancelling control in response to satisfaction of the external stimulus degree condition and the arousal level change degree condition. Thus, the environmental equipment control apparatus 200 can start cancelling control before the arousal level of the subject person is excessively increased, by appropriately adjusting the set degrees of the external stimulus degree condition and the arousal level change degree condition. Consequently, the arousal level of the subject person can be suppressed from being excessively increased.

(11) Modifications According to Appendix (11-1) Modification A

The case where the environmental equipment control apparatus 200 according to the embodiment described above grasps the arousal level of a subject person by using the current arousal level grasping unit 262 and leaves history data of the arousal level in the arousal level history data unit 272 to enable the arousal level change degree condition to be checked and performs cancelling control only when the arousal level change degree condition is satisfied has been described by way of example.

However, for example, if the degree of an external stimulus grasped by the external stimulus grasping unit 261 satisfies a predetermined external stimulus degree condition, the environmental equipment control apparatus 200 may estimate that the arousal level of a subject person is excessively increased without grasping the arousal level of the subject person and may control the air conditioner 210 and the lighting apparatus 220 in accordance with the degree of the external stimulus. In this manner, the environmental equipment control apparatus 200 may suppress an excessive increase in the arousal level of the subject person.

In this case, for example, the external stimulus cancelling correspondence data unit 275 may store a relationship between the volume of sound and the increasing amount of the set temperature so that the higher the volume of sound grasped by the external stimulus grasping unit 261, the greater the increasing amount of the set temperature of the air conditioner 210, and may store a relationship between the concentration of the odor component and the decreasing amount of the set illuminance so that the higher the concentration of the odor component grasped by the external stimulus grasping unit 261, the greater the decreasing amount of the set illuminance of the lighting apparatus 220.

(11-2) Modification B

The case where the environmental equipment control apparatus 200 according to the embodiment described above suppresses the work efficiency from decreasing due to a decrease in concentration caused by excessive arousal of a subject person, by performing cancelling control for lowering the arousal level of the subject person to an appropriate arousal level in order to avoid an excessive increase in the arousal level of the subject person (the state of excessive arousal) caused by an unintended external stimulus has been described by way of example.

However, the environmental equipment control apparatus 200 may perform not only cancelling control for decreasing the arousal level of a subject person to change the state to a state of an appropriate arousal level but also cancelling control for increasing the arousal level so that the arousal level reaches the appropriate arousal level when the arousal level of the subject person decreases because of an external stimulus. In addition, cancelling control for changing the arousal level to the appropriate arousal level may include both control for increasing the arousal level and control for decreasing the arousal level, and the environmental equipment control apparatus 200 may select and perform control in accordance with the state of the arousal level of the subject person.

For example, cancelling control for increasing the arousal level to be the appropriate arousal level when the arousal level of a subject person decreases because of an external stimulus can be used in a manner described below.

Figure 9:
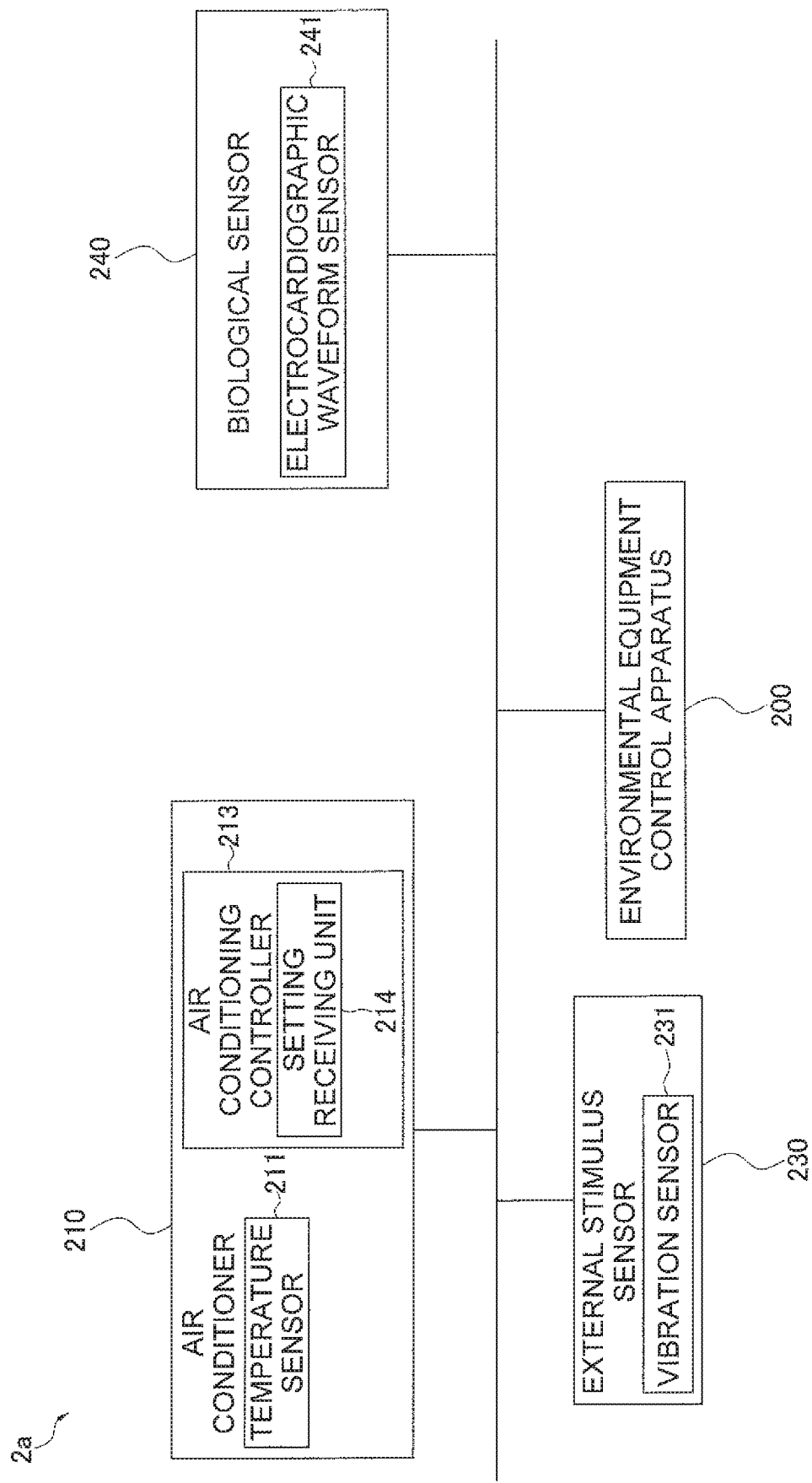
FIG. 9 is a diagram of a schematic configuration of the entirety of an environmental equipment control system according to a modification B according to the appendix.

FIG. 9 is an exemplary diagram illustrating a schematic configuration of the entirety of an environmental equipment control system 2a in which the environmental equipment control apparatus 200 according to the present modification is used.

In the environmental equipment control system 2a, a vibration sensor 233 is used instead of providing the odor sensor 231 and the sound sensor 232 in the external stimulus sensor 230 in the environmental equipment control system 2 according to the embodiment described above, and the lighting apparatus 220 is not included as a control target.

Such an environmental equipment control system 2a can be used in the case where an environment is controlled by setting an inner space of a vehicle such as a car or an electric train as a target space, for example. In this case, the environmental equipment control apparatus 200 grasps, as an external stimulus, vibration that occurs when the vehicle travels, and consequently can perform cancelling control for increasing the arousal level in order to suppress the arousal level of the subject person from being decreased by the external stimulus in the case where the arousal level of the subject on the vehicle decreases. Since the schematic configuration of the environmental equipment control apparatus 200 itself and the schematic flowchart of the cancelling control are substantially identical to those illustrated in FIGS. 7 and 8 in the embodiment described above, the illustration of these is omitted here.

The air conditioner 210 of the environmental equipment control system 2a is installed in a vehicle and is capable of controlling the temperature in the vehicle.

The vibration sensor 233 included in the external stimulus sensor 230 is attached to the vehicle, detects vibration that occurs when the vehicle travels, and transmits the resulting data to the data receiving unit 250 of the environmental equipment control apparatus 200 all the time.

The external stimulus grasping unit 261 of the environmental equipment control apparatus 200 grasps a drowsiness inducing degree in accordance with a predetermined rule from the magnitude and periodicity of the vibration occurring in the vehicle on the basis of the data of the vibration of the vehicle received by the data receiving unit 250 from the external stimulus sensor 230. The drowsiness inducing degree is not limited. For example, the drowsiness inducing degree can be grasped in accordance with the predetermined rule so that the drowsiness inducing degree is grasped as a higher value when a predetermined range of vibration that is neither too large nor too small occurs more periodically.

In addition, as in the embodiment described above, the current arousal level grasping unit 262 of the environmental equipment control apparatus 200 grasps the current arousal level of a subject person on the vehicle at any time from electrocardiographic waveform data of the subject person on the vehicle that is received by the data receiving unit 250 from the biological sensor 240 on the basis of information stored in the electrocardiogram-arousal level comparison data unit 271 of the storage unit 270, and stores the current arousal level in the arousal level history data unit 272.

In addition, the external stimulus determination criterion data unit 273 of the environmental equipment control apparatus 200 stores information of a predetermined external stimulus degree condition, as a determination criterion for use in determining whether the drowsiness inducing degree grasped by the external stimulus grasping unit 261 is a degree that requires cancelling control to be performed.

In addition, the arousal level change determination criterion data unit 274 of the environmental equipment control apparatus 200 stores a predetermined arousal level change degree condition, as a determination criterion for use in determining whether a decreasing degree of the arousal level of the subject person per unit time grasped from the arousal level history data unit 272 at the time when the drowsiness inducing degree grasped by the external stimulus grasping unit 261 satisfies the external stimulus degree condition is a degree that requires cancelling control to be performed.

Further, the external stimulus cancelling correspondence data unit 275 of the environmental equipment control apparatus 200 stores correspondence data indicating that cancelling control is to be performed through temperature control using the air conditioner 210 if it is expected that the arousal level of the subject person has decreased because of vibration of the vehicle. In addition, the external stimulus cancelling correspondence data unit 275 stores a relationship between an amount of decrease in the arousal level per unit time and an amount of change in the set temperature so that in the case where cancelling control is performed through temperature control using the air conditioner 210, the greater the amount of decrease in the arousal level per unit time at the time when the external stimulus degree condition is satisfied, the greater the amount of change in the set temperature of the air conditioner 210 (for example, so that the amount of decrease in the set temperature of the air conditioner 210 increases when the arousal level of the subject person is likely to greatly decrease because of vibration).

As in the processing in the embodiment described above, the control identifying unit 280 identifies control contents, and the control performing unit 290 causes the identified control contents to be performed. In this manner, the environmental equipment control apparatus 200 thus configured can cause cancelling control to be performed for increasing the arousal level to an appropriate arousal level even when the arousal level of a subject person decreases because of an external stimulus such as periodic vibration. Consequently, the environmental equipment control apparatus 200 can suppress an influence, on the subject person, of an unintended external stimulus that decreases the arousal level to be small.

(11-3) Modification C

The case where the environmental equipment control apparatus 200 according to the embodiment described above selectively uses environmental equipment corresponding to a kind of n external stimulus from among a plurality of kinds of environmental equipment (the air conditioner 210 and the lighting apparatus 220) to perform cancelling control has been described by way of example.

However, the environmental equipment controlled by the environmental equipment control apparatus 200 need not be a plurality of pieces. For example, the environmental equipment control apparatus 200 may perform cancelling control using only one piece of environmental equipment. In this case, it is difficult to efficiently adjust the arousal level in accordance with a kind of the external stimulus. However, a decrease in the arousal level of a subject person caused by the external stimulus can be suppressed to be small.

In the case where there is only one piece of environmental equipment in this manner contents of cancelling control corresponding to a kind of an external stimulus are determined in advance and stored in the external stimulus cancelling correspondence data unit 275.

(11-4) Modification D

The case where the environmental equipment control apparatus 200 according to the embodiment described above selectively uses one piece of environmental equipment corresponding to a kind of an external stimulus from among a plurality of kinds of environmental equipment (the air conditioner 210 and the lighting apparatus 220) to perform cancelling control has been described by way of example.

However, cancelling control may be performed by simultaneously controlling a plurality of pieces of environmental equipment in combination. For example, cancelling control may be performed by simultaneously changing the set temperature of the air conditioner 210 and changing the set illuminance of the lighting apparatus 220 in the embodiment described above. By performing cancelling control using a plurality of pieces of environmental equipment in this manner, an amount of change in a setting of a piece of environmental equipment can be suppressed to be small.

In the case where cancelling control is performed by simultaneously controlling a plurality of pieces of environmental equipment in combination in this manner, contents of the cancelling control through combinational control corresponding to a kind of an external stimulus are determined in advance and stored in the external stimulus cancelling correspondence data unit 275.

(11-5) Modification E

The environmental equipment control apparatus 200 according to the embodiment described above can be used not only in the case where a single subject person is present in a room but also in the case where a plurality of subject persons are present in a room. In the case where a plurality of subject persons are present in a room in this manner, processing similar to that of the embodiment described above can be performed using an average value of the arousal levels of the subject persons.

(11-6) Modification F

The case where the arousal level of a subject person is estimated on the basis of contents detected by the electrocardiographic waveform sensor 241 serving as the biological sensor 240 and is used to check the arousal level change degree condition has been described by way of example in the embodiment described above.

An index for use in determining a change in the state of a subject person resulting from an external stimulus is not limited to the arousal level, and may be, for example, mental or physical state information other than the arousal level or may be biological state information.

Among these, the mental or physical state information is secondary information estimated from primary information such as a heartbeat obtained by performing a measurement on a subject person, and includes, for example, information such as the arousal level, the concentration level, the nervousness level, the resting level, and an autonomic nerve balance index such as LF/HF. Estimation of these can be performed by applying a known relationship to primary information obtained using a known measurement apparatus. Note that LF/HF refers to an index of sympathetic nervous system activity calculated on the basis of a heartbeat pattern or a pulsation pattern.

In addition, the biological state information is primary information obtained by performing a measurement on a subject person using a measurement apparatus and includes, for example, information such as a heartbeat, body temperature, an amount of sweat, and voice. These can be measured using a known measurement apparatus. Note that, as for the heartbeat, information of a heartrate per unit time or a change in the heartrate is exemplified, for example. In addition, as for the voice, information of the volume of the voice, a change in the frequency, or the like is exemplified.

In addition, in the embodiment described above, the case where the arousal level of a subject person is estimated from electrocardiographic waveform data of the subject person has been described by way of example. However, for example, the arousal level may be estimated on the basis of a respiration rate of a subject person per unit time, or the arousal level may be estimated on the basis of an electroencephalogram of a subject person. Alternatively, the arousal level may be estimated on the basis of a combination of the electrocardiographic waveform data, the respiration rate per unit time, and the electroencephalogram.

(11-7) Modification G

In the embodiment described above, the description has been given of the air conditioner 210 that performs temperature control and the lighting apparatus 220 that performs illuminance control that is a kind different from the kind of the temperature control, as pieces of environmental equipment serving as a plurality of kinds of environment control means by way of example.

However, the plurality of kinds of environment control means need not be constituted by a plurality of kinds of apparatuses. For example, if an air conditioner that is a single integrated apparatus is capable of implementing temperature control, humidity control, and wind velocity control, the temperature control may be treated as one kind of environment control means, the humidity control may be treated as another kind of environment control means, and the wind velocity control may be treated as still another kind of environment control means.

In this case, for example, cancelling control may be performed by changing the set temperature, the set humidity, and the set wind velocity in accordance with a kind of an external stimulus or the degree of change in the arousal level of a subject person caused by the external stimulus.

(11-8) Modification H

In the embodiment described above, the description has been given of the air conditioner 210 that performs temperature control and the lighting apparatus 220 that performs illuminance control, as pieces of environmental equipment serving as environment control means by way of example.

However, the environmental equipment serving as environment control means is not limited to this.

For example, a humidification apparatus capable of adjusting the humidity in a room where a subject person is present may be used as the environmental equipment serving as the environment control means. Note that the humidification apparatus may be integrally included in an air conditioner that performs temperature control. For example, the humidification apparatus detects humidity in a room using a humidity sensor and adjusts the humidity in the room in consideration of the humidity. In this manner, the humidification apparatus can change the arousal level or the like of a subject person. For example, when the arousal level of a subject person increases because of an uncomfortable odor, the humidification apparatus is controlled so that the humidity in the room decreases. In this manner, departure of particles of an odor component that are attached to a wall plate, a curtain, or the like in the room is suppressed to create an environment in which the particles of the odor component are more likely to diffuse. Consequently, an area where the concentration of the odor component is high can be removed in a short time, and a stimulus to the subject person can be decreased by reducing the odor component itself. In addition, the illuminance in the room decreases because it becomes cloudy and the drowsiness of a subject person increases, for example, in a room equipped with no lighting apparatus, in the case where a lighting apparatus is powered off, or the like. In such a case, the drowsiness of the subject person can be suppressed by controlling the humidification apparatus so that the humidity in the room decreases.

In addition, a wind velocity apparatus capable of adjusting the wind velocity around a subject person may be used as the environmental equipment serving as the environment control means. Note that the wind velocity apparatus may be integrally included in an air conditioner that performs temperature control. For example, when a stimulus is given to a subject person as a result of being distracted by voice of a speaking adjacent person at an office or the like, the wind velocity apparatus is controlled so that the wind velocity around the subject person increases. In this manner, a situation may be created where the subject person hardly hears spoken contents by superimposing sound of the wind onto the speaking voice. Note that how to distinguish speaking voice from other sound is not limited. The external stimulus grasping unit 261 may grasp the speaking voice using known sound recognition software. In addition, the illuminance in the room decreases because it becomes cloudy and the drowsiness of a subject person increases, for example, in a room equipped with no lighting apparatus, in the case where a lighting apparatus is powered off, or the like. In such a case, the drowsiness of the subject person may be suppressed by controlling the wind velocity apparatus so that the wind velocity around the subject person increases to make the sympathetic nervous system of the subject person dominant.

In addition, a lighting apparatus capable of changing the color temperature in a room where a subject person is present may be used as the environmental equipment serving as the environment control means. The lighting apparatus capable of adjusting the color temperature performs control to change the color temperature in a room. In this manner, the lighting apparatus can change the state such as the arousal level of the subject person. For example, if a subject person feels hot as a result of the temperature in the room increasing in a room equipped with no air conditioner, in the case where an air conditioner is powered off, or the like, the subject person may be illuminated with light of a color having a high color temperature such as white to make the subject person feel cool. If the subject person feels cold as a result of the temperature in the room decreasing, the subject person may be illuminated with light of a color having a low color temperature, such as yellow, daylight color, or lightbulb color to make the subject person feel warm. Note that, as the lighting apparatus, an apparatus capable of adjusting the flux of light, an apparatus capable of adjusting the luminous intensity, or an apparatus capable of adjusting the brightness may be used. In addition, in the case where a stimulus is given to a subject person so that the subject person feels too silent to sleep as a result of continuation of a state in which the volume of sound or sound pressure is too small in a bedroom, the lighting apparatus is controlled to increase the illuminance in the room. This makes the mind of the subject person concentrated on silence be distributed, so that the subject person is less likely to feel too silent. In addition, in the case where a stimulus is given to a subject person so that the subject person feels too silent to sleep as a result of continuation of a state in which the volume of sound or sound pressure is too small in a bedroom, the lighting apparatus is controlled to decrease the color temperature in the room to make the parasympathetic nervous system of the subject person dominant. In this way, the drowsiness may be induced.

For example, a ventilation apparatus capable of adjusting the carbon dioxide concentration in a room by ventilating air in the room where a subject person is present may be used as the environmental equipment serving as the environment control means. For example, the ventilation apparatus detects the carbon dioxide concentration in the room using a carbon dioxide concentration sensor and controls an amount of ventilation in consideration of the detected concentration to adjust the carbon dioxide concentration in the room. In this manner, the ventilation apparatus can change the arousal level of the subject person. For example, when the arousal level of a subject person increases because of an uncomfortable odor, ventilation is performed using the ventilation apparatus so that the carbon dioxide concentration decreases. In this manner, excessive arousal of the subject person can be suppressed.

In addition, a deodorant apparatus capable of decreasing the concentration of an odor component in a room where a subject person is present may be used as the environmental equipment serving as the environment control means. For example, the deodorant apparatus detects the concentration of the odor component in the room using an odor concentration sensor and controls an amount of deodorant agent or an amount of adsorbent to be atomized in consideration of the detected concentration to adjust the concentration of the odor component in the room. In this manner, the deodorant apparatus can change the arousal level of the subject person. For example, when the arousal level of a subject person increases because of the humidity grasped using a humidity sensor included in an air conditioner or the like being higher than a predetermined value when an environment in which the concentration of the odor component is high, control is performed to atomize the deodorant agent or the like from the deodorizing apparatus. In this manner, excessive arousal of the subject person can be suppressed.

In addition, a fragrance apparatus such as an aroma diffuser capable of providing scent to a subject person by atomizing a predetermined aroma component to a room where the subject person is present may be used as the environmental equipment serving as the environment control means. In addition, as the fragrance apparatus, an apparatus capable of atomizing a plurality of kinds of aroma components depending on the purpose of increasing the arousal level of the subject person, the purpose of decreasing the arousal level of the subject person, or the like is preferable. For example, the fragrance apparatus detects the concentration of the aroma component in the room using an aroma component concentration sensor and controls an amount of the aroma component to be atomized in consideration of the aroma concentration to adjust the concentration of the aroma component in the room. In this manner, the fragrance apparatus can change the state such as the arousal level of the subject person. For example, when the temperature is higher than a predetermined value, menthol or the like that is the aroma component included in the fragrance apparatus may be atomized to allow the subject person to feel refreshed. In this manner, the discomfort which the subject person feels because of a high temperature may be reduced. When the temperature is lower than a predetermined value, an aroma of cinnamon, vanilla, or the like which is the aroma component included in the fragrance apparatus may be atomized to allow the subject person to feel warm. In this manner, the discomfort which the subject person feels because of a low temperature may be reduced. When the humidity grasped by a humidity sensor included in an air conditioner or the like is higher than a predetermined value, menthol or the like that is the aroma component included in the fragrance apparatus may be atomized to allow the subject person to feel refreshed. In this manner, the discomfort which the subject person feels because of a high humidity may be reduced. Further, when noise (sound of high volume, high sound pressure, or unpleasant frequency) is detected by a sound sensor, an aroma of lavender or the like that is the aroma component included in the fragrance apparatus and having a relaxing effect may be atomized to alleviate the way in which the subject person feels the noise or the like.

In addition, an audio apparatus capable of changing a sound environment in a room where a subject person is present may be used as the environmental equipment serving as the environment control means. For example, the audio apparatus selectively plays up-tempo music or slow-tempo music that is provided in advance. In this manner, the audio apparatus can change the arousal level of the subject person. For example, when the arousal level of a subject person decreases as result of an increase in room temperature in a room equipped with no air conditioner, in the case where an air conditioner is powered off, or the like, the audio apparatus is controlled to output and play data of up-tempo music stored in advance. In this manner, the arousal level of the subject person can be increased. In addition, for example, when the arousal level of a subject person increases to reach excessive arousal because of the humidity and temperature in the room being higher than predetermined values, the audio apparatus is controlled to output and play data of tropical music stored in advance to match a high-temperature high-humidity environment with music and allow the subject person to relax. In this manner, the arousal level of the subject person can be decreased and excessive arousal can be suppressed. In addition, for example, when a stimulus is given to a subject person because of a high temperature in a room, the audio apparatus is controlled to output sound using data of a sound source that causes a subject person to feel cool (sound of a wind-bell) stored in advance. In this manner, the degree by which the subject person feels hot may be suppressed. Further when a stimulus is given to a subject person as a result of being distracted by voice of a speaking adjacent person at an office or the like, the audio apparatus is controlled to output and play data of an environmental sound or air conditioning sound stored in advance to superimpose the environmental sound or the like onto the speaking voice. In this manner, a situation may be created where the subject person hardly hears spoken contents.

In addition, the environmental equipment serving as environment control means may be an apparatus that adjusts radiant heat to heat a subject person with radiant heat. Examples of the apparatus that adjusts radiant heat include an infrared heater or the like. This apparatus that adjusts radiant heat directly heats the subject person with radiant heat. Thus, an effect similar to that obtained by performing cancelling control by increasing air temperature around a subject person using an air conditioner is obtained.

(11-9) Modification I

The case where increasing the set temperature of the air conditioner 210 and decreasing the set illuminance of the lighting apparatus 220 are determined in advance for suppressing an excessive increase in the arousal level of a subject person through cancelling control has been described by way of example in the embodiment described above.

In contrast, for example, the environmental equipment control apparatus 200 may grasp a tendency or degree of change in the arousal level of a subject person depending on a kind of control contents performed by environmental equipment by examining the tendency or degree in advance or the like. When the environmental equipment control apparatus 200 performs cancelling control, the environmental equipment control apparatus 200 may perform only control grasped by the environmental equipment control apparatus 200 as control that can change the arousal level of the subject person so that an influence of an external stimulus is suppressed. For example, for a subject person for whom it is apparent that control for decreasing the set illuminance of the lighting apparatus 220 is effective against noise serving as an external stimulus, a combination of the external stimulus and the control can be stored in advance in the external stimulus cancelling correspondence data unit 275 of the environmental equipment control apparatus 200.

This enables the accurate tendency of the arousal level of the subject person depending on a kind of control of environmental equipment to be utilized and enables the influence of the external stimulus to be suppressed more reliably.

(11-10) Modification J

The case where sound volume detected by the sound sensor 232 to be greater than or equal to a predetermined value is handled as an external stimulus has been described by way of example in the embodiment described above.

However, when the frequency of sound detected by the sound sensor 232 includes a predetermined unpleasant frequency, the sound may be handled as an external stimulus. Further, when the volume of sound having a frequency including the predetermined unpleasant frequency is greater than or equal to a predetermined value, the sound may be handled as an external stimulus. In addition, when the sound pressure (dB) detected by the sound sensor 232 exceeds a predetermined value, the sound may be handled as an external stimulus. Further, when a state in which the volume of sound or the sound pressure (dB) detected by the sound sensor 232 is smaller than a predetermined value continues for a predetermined continuous period, the too-silent situation may be grasped as a stimulus given to a subject person and control for cancelling or moderating the stimulus may be performed.

(11-11) Modification K

The case where control for suppressing a subject person from being excessively aroused by performing control for decreasing the illuminance as cancelling control using a lighting apparatus when a stimulus relating to odor is given to the subject person has been described by way of example in the embodiment described above.

However, the cancelling control using a lighting apparatus that controls the illuminance is not limited to the cancelling control that cancels the odor by decreasing the illuminance. For example, the cancelling control may be cancelling control for changing the illuminance to increase so that the mind of a subject person is distributed (the mind for feeling unpleasant by the odor is distributed) and the subject person's sensitiveness to feel the odor is decreased. In addition, the cancelling control may be control for cancelling a stimulus given to a subject perform by the occurrence of noise in a situation in which a lighting apparatus is switched off and it is dark in a room by suppressing the degree by which the subject person feels the noise obstructive to be small by controlling the lighting apparatus to slightly increase the illuminance.

(11-12) Modification L

The case where control for suppressing a subject person from being excessively aroused by performing control for increasing the temperature in a room when a stimulus relating to sound is given to the subject person, as cancelling control using an air conditioner that controls the temperature in the room has been described by way of example in the embodiment described above.

However, the cancelling control using an air conditioner that controls temperature is not limited to cancelling control for cancelling the stimulus relating to sound by increasing the temperature. For example, the cancelling control may be cancelling control for making the subject person less likely to feel the odor by controlling the air conditioner to decrease the temperature in the room when a stimulus relating to odor is given to a subject person. In addition, the cancelling control may be cancelling control for making the sympathetic nervous system of a subject person more active by controlling an air conditioner to decrease the temperature in a room when a stimulus relating to a drowsiness-inducing scent such as lavender is given to the subject person. Further, the cancelling control may be cancelling control for making the sympathetic nervous system of a subject person more active by controlling an air conditioner to decrease the temperature in a room when the way in which a speaker speaks during a lecture or meeting is in a drowsiness-inducing tone and a stimulus is given to the subject person. Note that a determination method for detecting whether the way in which a speaker speaks induces drowsiness is not limited here. For example, it may be determined (by the external stimulus grasping unit 261 or the like, for example) that the way in which a speaker speaks induces drowsiness if a state in which sound detected by a sound sensor is close to a predetermined sine wave and a change in sound volume or sound pressure per unit time is within a predetermined value continues for a predetermined continuous period or more. Further, the cancelling control may be cancelling control for making the parasympathetic nervous system of a subject person dominant by controlling an air conditioner to increase the temperature in a room when a stimulus causing a subject person to feel too silent is given to the subject person as a result of continuation of a state in which the volume of sound or sound pressure is too small at an office or in a bedroom for a predetermined time or more. In addition, for example, the cancelling control may be cancelling control for suppressing the drowsiness of a subject person by controlling an air conditioner to decrease the temperature in a room when the illuminance in the room decreases because it becomes cloudy and the drowsiness of the subject person increases in the room equipped with no lighting apparatus, in the case where a lighting apparatus is powered off, or the like.

(11-13) Modification M

The case where contents of control performed on environmental equipment to cancel an external stimulus such as sound or odor are determined in advance has been described by way of example in the embodiment and modifications described above.

Here, it is considered that, even if the same kind of stimulus is given to a subject person, the degree of the influence of the external stimulus on the subject person changes depending on the situation in which the subject person is. For example, when a sound stimulus of speaking voice is given to a subject person, the degree by which the influence of the sound stimulus of speaking voice on the subject person is to be reduced may differ between the case where the subject person is trying to perform some kind of work with concentration and the case where the subject person is trying to sleep. Therefore, the control degree of environmental equipment may be changed even for the same stimulus depending on the situation in which the subject person is or depending on the purpose. Such a situation in which the subject person is and such a purpose are not limited. For example, the situation where the subject person is may be a situation where the subject person is trying to concentrate, a situation where the subject person is trying to sleep, a situation where the subject person is trying to relax, and so on. A method used by the environmental equipment control system 2 to grasp such a situation in which the subject person is or such a purpose is not limited. For example, the setting receiving unit 214 of the air conditioning controller 213 may be configured to be capable of receiving input from the subject person, or the data receiving unit 250 or the like of the environmental equipment control apparatus 200 may be configured to be capable of receiving input from the subject person. The external stimulus cancelling correspondence data unit 275 of the storage unit 270 of the environmental equipment control apparatus 200 may further store cancelling control corresponding to each situation in which the subject person is or each purpose in advance. The control identifying unit 280 of the environmental equipment control apparatus 200 may identify specific contents of the cancelling control on the basis of the data of the external stimulus cancelling correspondence data unit 275.

Figure 10:
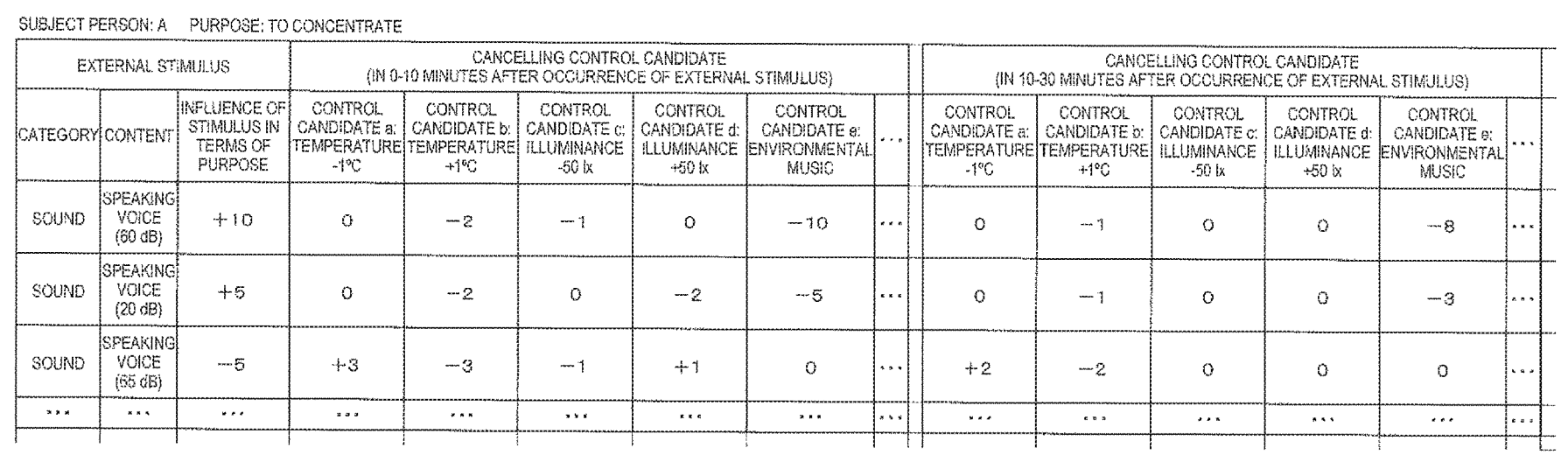

Note that instead of storing cancelling control corresponding to each situation in which the subject person is or each purpose in advance in the external stimulus cancelling correspondence data unit 275, an effect that can be given to a subject person may be stored in the external stimulus cancelling correspondence data unit 275 for each of a plurality of kinds of cancelling control candidates using a plurality of kinds of environmental equipment included in the environmental equipment control system 2 (an effect of each of the cancelling control candidates for each kind of the external stimulus given to the subject person and for each situation in which the subject person is or each purpose) as illustrated in a table of FIG. 10, for example. In this case, the control identifying unit 280 of the environmental equipment control apparatus 200 selects and identifies cancelling control as being most effective to cancel an external stimulus currently given to a subject person from among effects stored in the external stimulus cancelling correspondence data unit 275 for each situation in which the subject person is or each purpose against the external stimulus currently given to the subject person. Further, data for identifying an effect caused on each subject person by cancelling control against each external stimulus given to the subject person for each situation in which the subject person is or each purpose is preferably stored in advance in the external stimulus cancelling correspondence data unit 275.

For example, as illustrated in the table of FIG. 10, it is indicated that in a situation in which a subject person A is trying to perform work with concentration and hears speaking voice (60 dB) as an external stimulus, the subject person A is excessively aroused by a degree of +10 (here, + indicates the degree of arousal, and – indicates the degree of drowsiness). In this situation, an effect (a change in the arousal level of the subject person A is 0) obtained when cancelling control (control candidate a) for changing the set temperature by −1° C. is performed using an air conditioner for the subject person A, an effect (a change in the arousal level of the subject person A is −2) obtained when cancelling control (control candidate b) for changing the set temperature by +1° C. is performed using an air conditioner for the subject person A, an effect (a change in the arousal level of the subject person A is −1) obtained when cancelling control (control candidate c) for changing the set illuminance by −50 1x is performed using a lighting apparatus for the subject person A, an effect (a change in the arousal level of the subject person A is 0) obtained when cancelling control (control candidate d) for changing the set illuminance by +50 1x is performed using a lighting apparatus for the subject person A, and an effect (a change in the arousal level of the subject person A is −10) obtained when cancelling control (control candidate e) for playing a predetermined environmental music is performed using an audio apparatus for the subject person A are stored in advance in the external stimulus cancelling correspondence data unit 275. The control identifying unit 280 of the environmental equipment control apparatus 200 can identify that the cancelling control capable of most effectively cancelling an external stimulus against the external stimulus (speaking voice of 60 dB) currently given to the subject person A in the situation in which the subject person A currently is and the purpose (to concentrate) is the cancelling control (control candidate e) for playing the predetermined environmental music using an audio apparatus, with reference to the data in the external stimulus cancelling correspondence data unit 275.

Note that in this case, even for the same stimulus relating to sound, the aforementioned stimulus of speaking voice (60 dB) and a stimulus given as a result of continuation of a too-silent environment (20 dB or less) may be handled as different stimuli as illustrated in the table of FIG. 10, for example. In other words, a table in which a plurality of kinds of cancelling control candidates for each of distinguished stimuli, for each subject person, and for each situation in which the subject person is or each purpose may be stored in the external stimulus cancelling correspondence data unit 275. Specifically, suppose that a situation in which an external stimulus is given to the subject person A as a result of continuation of a too-silent environment (20 dB or less) when the subject person A is try to work with concentration is a situation where the subject person A is aroused excessively by approximately +5. In this situation, an effect (a change in the arousal level of the subject person A is 0) obtained when cancelling control (control candidate a) for changing the set temperature by −1° C. is performed using an air conditioner for the subject person A, an effect (a change in the arousal level of the subject person A is −2) obtained when cancelling control (control candidate b) for changing the set temperature by +1° C. is performed using an air conditioner for the subject person A, an effect (a change in the arousal level of the subject person A is 0) obtained when cancelling control (control candidate c) for changing the set illuminance by −50 1x is performed using a lighting apparatus for the subject person A, an effect (a change in the arousal level of the subject person A is −2) obtained when cancelling control (control candidate d) for changing the set illuminance by +50 1x is performed using a lighting apparatus for the subject person A, and an effect (a change in the arousal level of the subject person A is −5) obtained when cancelling control (control candidate e) for playing a predetermined environmental music is performed using an audio apparatus for the subject person A are stored in advance in the external stimulus cancelling correspondence data unit 275. The control identifying unit 280 of the environmental equipment control apparatus 200 can identify that the cancelling control that can most effectively cancel an external stimulus (external stimulus resulting from continuation of the too-silent environment (20 dB or less)) currently given to the subject person A in the situation in which the subject person A is and the purpose (to concentrate) is the cancelling control (control candidate e) for playing the predetermined environmental music using an audio apparatus, with reference to the data in the external stimulus cancelling correspondence data unit 275.

In addition, the effect, on a subject person, of a stimulus given to the subject person by performing cancelling control to control environmental equipment tends to decrease by repeatedly receiving the same stimulus, as a result of the same stimulus being given. Therefore, the control identifying unit 280 of the environmental equipment control apparatus 200 preferably selects cancelling control while correcting the data in the external stimulus cancelling correspondence data unit 275 so that the aforementioned effect decreases, on the basis of the frequency with which or the degree by which a stimulus is given to the subject person using the same environmental equipment. For example, as illustrated in the table of FIG. 10, an effect obtained by cancelling control performed in an initial period from when an external stimulus is given (in 0 to 10 minutes from the external stimulus) and an effect obtained by cancelling control performed in a period that is after a predetermined time period passes from the external stimulus is given (in 10 to 30 minutes from the external stimulus) may be stored in the external stimulus cancelling correspondence data unit 275 in a distinguished manner. In this manner, it is possible to not only select control that is most effective as cancelling control to be performed in an initial period from when a stimulus is given but also select again control that is most effective as cancelling control to be performed after some time passes from when the stimulus is given.

While the embodiments of the present disclosure have been described above, it should be understood that various modifications can be made on the configurations and details without departing from the gist and the scope of the present disclosure that are described in the claims. Note that the embodiment and the modifications thereof and the embodiment according to the appendix and the modifications thereof can be appropriately combined together in a range causing no contradiction.

What is claimed is:

1. An environmental control equipment control apparatus that controls an environment of a target space where a plurality of subject persons are present, using a plurality of kinds of environmental control equipment, the environmental control equipment control apparatus comprising:
    a state information receiver configured to receive state information relating to states of the plurality of subject persons; and
    an electronic controller configured to control the plurality of kinds of environmental control equipment such that the state information of the plurality of subject persons received by the state information receiver satisfies a predetermined target state condition.

2. The environmental control equipment control apparatus according to claim 1, further comprising:
    a characteristics receiver configured to receive response characteristics information for the plurality of subject persons, the response characteristics information indicating response characteristics to each kind of environmental stimulus that is changeable using the plurality of kinds of environmental control equipment,
    the electronic controller being further configured to control the plurality of kinds of environmental control equipment based on
        the state information of the plurality of subject persons received, by the state information receiver and
        the response characteristics information received by the characteristics receiver.

3. The environmental control equipment control apparatus according to claim 2, wherein
    the characteristics receiver is further configured to create the response characteristics information using accumulated information of the state information of the plurality of subject persons received by the state information receiver in response to control performed on the plurality of kinds of environmental control equipment by the electronic controller.

4. The environmental control equipment control apparatus according to claim 3, further comprising:
    a data receiver configured to receive the response characteristics information or input of information relating to the response characteristics information,
    the characteristics receiver being further configured to receive the response characteristics information using the information received by the data receiver.

5. The environmental control equipment control apparatus according to claim 3, wherein
    the characteristics receiver is further configured
        to receive the response characteristics information of a first subject person, the first subject person being at least one subject person of the plurality of subject persons and
        to apply the response characteristics information of the first subject person to a second subject person determined to have a similarity to the first subject person, the second subject person being one of the plurality of subject persons.

6. The environmental control equipment control apparatus according to claim 2, further comprising:
    a data receiver configured to receive the response characteristics information or input of information relating to the response characteristics information,
    the characteristics receiver being further configured to receive the response characteristics information using the information received by the data receiver.

7. The environmental control equipment control apparatus according to claim 6, wherein
    the characteristics receiver is further configured
        to receive the response characteristics information of a first subject person, the first subject person being at least one subject person of the plurality of subject persons and
        to apply the response characteristics information of the first subject person to a second subject person determined to have a similarity to the first subject person, the second subject person being one of the plurality of subject persons.

8. The environmental control equipment control apparatus according to claim 2, wherein
    the characteristics receiver is further configured
        to receive the response characteristics information of a first subject person, the first subject person being at least one subject person of the plurality of subject persons and
        to apply the response characteristics information of the first subject person to a second subject person determined to have a similarity to the first subject person, the second subject person being one of the plurality of subject persons.

9. The environmental control equipment control apparatus according to claim 2, wherein
    the plurality of kinds of environmental control equipment include at least any two or more of
        a temperature adjustment apparatus,
        a humidity adjustment apparatus,
        a wind velocity adjustment apparatus,
        a carbon dioxide concentration adjustment apparatus,
        an odor adjustment apparatus,
        a sound adjustment apparatus, and
        a light adjustment apparatus.

10. The environmental control equipment control apparatus according to claim 1, wherein
    the plurality of kinds of environmental control equipment include at least any two or more of
        a temperature adjustment apparatus,
        a humidity adjustment apparatus,
        a wind velocity adjustment apparatus,
        a carbon dioxide concentration adjustment apparatus,
        an odor adjustment apparatus,
        a sound adjustment apparatus, and
        a light adjustment apparatus.

11. An environmental control equipment control apparatus that controls an environment of a target space where a subject person is present, using an environmental control equipment, the environmental control equipment control apparatus comprising:
    an environmental stimulus unit receiver configured to receive a second environmental stimulus given to the subject person other than a first environmental stimulus caused by control of the environmental control equipment; and
    an electronic controller configured to control the environmental control equipment such that an influence of the second environmental stimulus received by the environmental stimulus receiver on the subject person is cancelled or reduced.

12. The environmental control equipment control apparatus according to claim 11, wherein a plurality of kinds of the environmental control equipment are provided, the plurality of kinds of environmental control equipment are capable of supplying environmental stimuli that are different from each other, and the electronic controller is further configured to control the plurality of kinds of environmental control equipment such that an influence of the second environmental stimulus received by the environmental stimulus receiver on the subject person is cancelled or reduced.

13. The environmental control equipment control apparatus according to claim 12, wherein the plurality of kinds of environmental control equipment include at least any two or more of a temperature adjustment apparatus, a humidity adjustment apparatus, a wind velocity adjustment apparatus, a carbon dioxide concentration adjustment apparatus, an odor adjustment apparatus, a sound adjustment apparatus, a light adjustment apparatus, and a radiant heat adjustment apparatus.

14. The environmental control equipment control apparatus according to claim 12, further comprising:

a state information receiver configured to receive state information relating to a state of the subject person, the electronic controller being further configured to control the environment control means such that an influence, on the subject person, of a change other than a change caused by control of the environmental control equipment among changes in the state information is cancelled or reduced.

15. The environmental control equipment control apparatus according to claim 12, wherein the environmental stimulus receiver is further configured to receive an environmental stimulus of at least one of sound and odor.

16. The environmental control equipment control apparatus according to claim 11, further comprising:

a state information receiver configured to receive state information relating to a state of the subject person, the electronic controller being further configured to control the environmental control equipment such that an influence, on the subject person, of a change other than a change caused by control of the environmental control equipment among changes in the state information is cancelled or reduced.

17. The environmental control equipment control apparatus according to claim 11, wherein the environmental stimulus receiver is further configured to receive an environmental stimulus of at least one of sound and odor.

* * * * *